US012667776B2

(12) United States Patent
Zhang et al.

(10) Patent No.: US 12,667,776 B2
(45) Date of Patent: Jun. 30, 2026

(54) TURN-BASED BATTLE-BASED INTERFACE DISPLAY METHOD, TURN-BASED BATTLE-BASED INFORMATION PROVIDING METHOD, AND SYSTEM

(71) Applicant: Tencent Technology (Shenzhen) Company Limited, Shenzhen (CN)

(72) Inventors: Chenhao Zhang, Shenzhen (CN); Dongsong Xu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 218 days.

(21) Appl. No.: 18/677,754

(22) Filed: May 29, 2024

(65) Prior Publication Data

US 2024/0316451 A1     Sep. 26, 2024

Related U.S. Application Data

(63) Continuation of application No. PCT/CN2023/099637, filed on Jun. 12, 2023.

(30) Foreign Application Priority Data

Aug. 19, 2022     (CN) .......................... 202211000457.3

(51) Int. Cl.
| | |
|---|---|
| *A63F 13/355* | (2014.01) |
| *A63F 13/53* | (2014.01) |
| *A63F 13/69* | (2014.01) |
| *A63F 13/77* | (2014.01) |
| *A63F 13/822* | (2014.01) |

(52) U.S. Cl.
CPC ............ *A63F 13/355* (2014.09); *A63F 13/53* (2014.09); *A63F 13/69* (2014.09); *A63F 13/77* (2014.09); *A63F 13/822* (2014.09)

(58) Field of Classification Search
None
See application file for complete search history.

(56) References Cited

U.S. PATENT DOCUMENTS

| | | | |
|---|---|---|---|
| 6,884,169 B2 * | 4/2005 | Tsuchida ............... | A63F 13/822 463/31 |
| 2006/0068905 A1 * | 3/2006 | Umezaki ................. | A63F 13/69 463/31 |
| 2014/0243089 A1 * | 8/2014 | Tsukioka ................ | A63F 13/00 463/31 |

(Continued)

*Primary Examiner* — Dorothy Harris

(74) *Attorney, Agent, or Firm* — ARENTFOX SCHIFF LLP

(57) ABSTRACT

In a turn-based battle-based interface display method, an initiation request for the battle action is transmitted to a first server when a user initiates a battle action of a turn-based battle. Battle rendering information of the battle action is received from the first server. Halo rendering information is received from a second server, the second server being configured to process a virtual environment. The halo rendering information is generated by the second server according to halo information transmitted by the first server. The halo information represents a halo triggered by the battle action. The halo impacts an element in a battle scene of the turn-based battle. The halo is rendered according to the halo rendering information in a process of rendering the battle action based on the battle rendering information.

20 Claims, 12 Drawing Sheets

(56) References Cited

U.S. PATENT DOCUMENTS

2014/0357356 A1* 12/2014 Horie ................. A63F 13/2145
463/31
2016/0367900 A1* 12/2016 Suzuki ................... A63F 13/67

* cited by examiner

Transmit, in a case of detecting that a participant of a turn-based battle initiates battle behavior, an initiation request for the battle behavior to a first server ~ 401

Receive battle rendering information from the first server, where the battle rendering information is configured for rendering the battle behavior ~ 402

Receive halo rendering information from a second server, where the halo rendering information is information generated by the second server according to halo information transmitted by the first server, the halo information is configured for representing a halo triggered by the battle behavior, and the halo has impact on an element in a battle scene of the turn-based battle ~ 403

Render the halo according to the halo rendering information in a procedure that a battle control process renders the battle behavior according to the battle rendering information ~ 404

FIG. 4

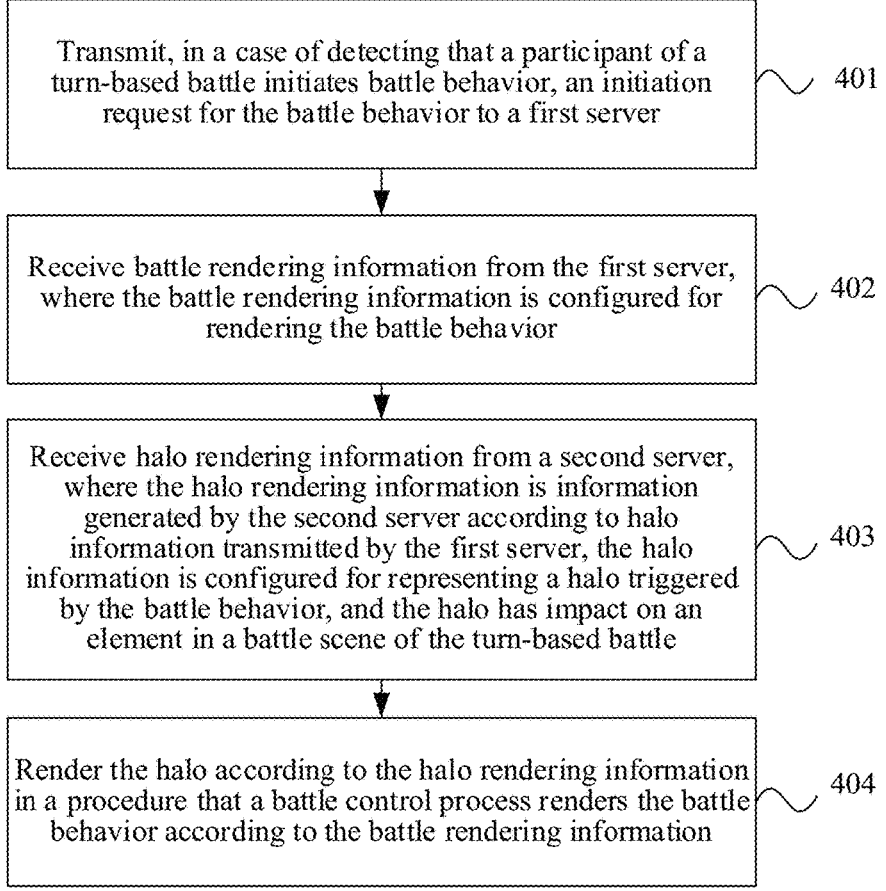
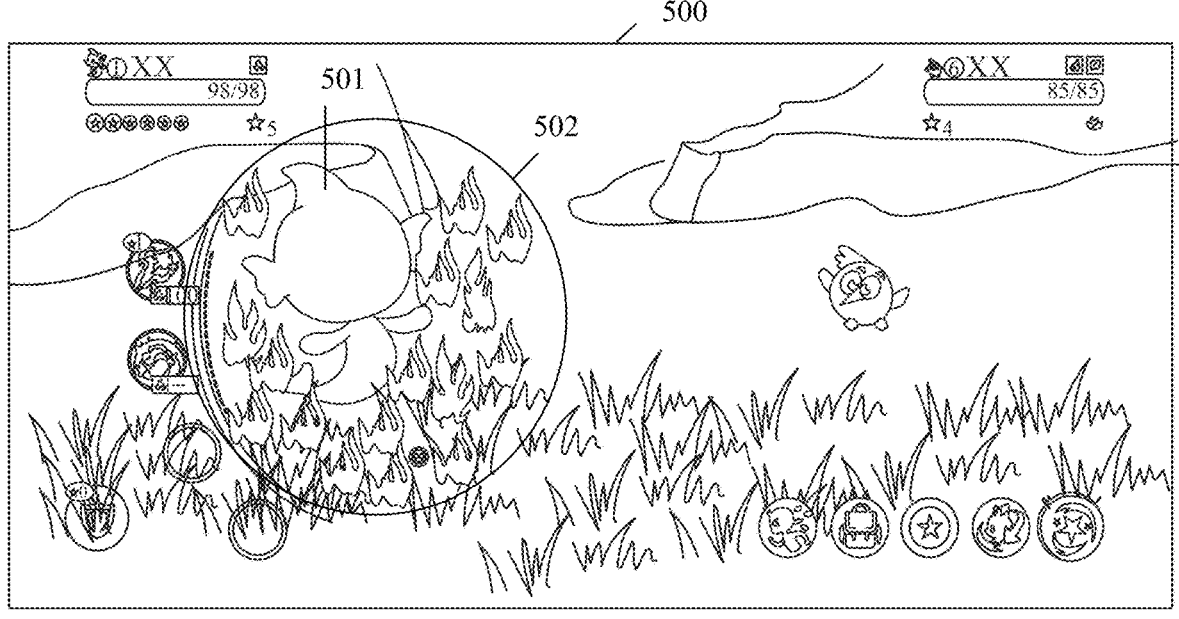

FIG. 5

TURN-BASED BATTLE-BASED INTERFACE DISPLAY METHOD, TURN-BASED BATTLE-BASED INFORMATION PROVIDING METHOD, AND SYSTEM

RELATED APPLICATIONS

The present application is a continuation of International Application No. PCT/CN2023/099637, filed on Jun. 12, 2023, which claims priority to Chinese Patent Application 202211000457.3, filed on Aug. 19, 2022, and entitled "TURN-BASED BATTLE-BASED INTERFACE DISPLAY METHOD, TURN-BASED BATTLE-BASED INFORMATION PROVIDING METHOD, AND SYSTEM." The entire disclosures of the prior applications are hereby incorporated by reference.

FIELD OF THE TECHNOLOGY

Embodiments of this disclosure relate to the field of computer technologies, including to a turn-based battle-based interface display method, a turn-based battle-based information providing method, and a system.

BACKGROUND OF THE DISCLOSURE

A turn-based role-playing game (RPG) is a game that uses a turn-based battle strategy. In the turn-based RPG, a player may play a master virtual character in a realistic world or a virtual world, and may use the master virtual character or a pet virtual character owned by the master virtual character to perform a turn-based battle with a monster controlled by an enemy unit (for example, a non-player character (NPC) or artificial intelligence (AI) in the game, or a pet virtual character caught by another character).

In the related art, the turn-based RPG provides two different maps: a world map and a battle map. When the master virtual character performs a non-battle activity (for example, exploring, catching a pet virtual character, collecting treasure boxes, or collection virtual props) in the world map, a world scene (or referred to as a non-battle scene) corresponding to the world map is maintained and executed by a scene server, and the scene server runs environment data configured for generating a scene. In a battle scene, when the master virtual character performs a battle activity (for example, controlling a caught pet virtual character to perform a turn-based battle with an enemy unit) in the battle map, the battle scene corresponding to the battle map is executed by a battle server, and the battle server needs to copy environment data configured for rendering a scene from the scene server and generate a scene with a halo that is generated by the battle activity based on the copied environment data.

However, in the related art, the scene server for the world scene and the battle server for the battle scene both need to maintain one piece of environment data, after changes in the world scene, if the master virtual character performs a battle activity in the battle map again, the scene server needs to copy updated environment data to the battle server, for the battle server to generate a scene with a halo that is generated by the battle activity based on the updated environment data. As a result, service logic and data maintenance redundancy exists between the scene server and the battle server, leading to a greater data processing amount and data transmission amount, which affects the environment generation efficiency.

SUMMARY

Embodiments of this disclosure include a turn-based battle-based interface display method, a turn-based battle-based information providing method, and a system, which can reduce a transmission amount of data exchange between a first server and a second server, and can also avoid a redundancy problem that both the first server and the second server maintain one piece of scene data, thereby improving the interface display efficiency of a client while reducing maintenance overheads of a server. Technical solutions may include the following.

According to an aspect of the embodiments of this disclosure, a turn-based battle-based interface display method is provided. In the turn-based battle-based interface display method, an initiation request for the battle action is transmitted to a first server when a user initiates a battle action of a turn-based battle. Battle rendering information of the battle action is received from the first server. Halo rendering information is received from a second server, the second server being configured to process a virtual environment. The halo rendering information is generated by the second server according to halo information transmitted by the first server. The halo information represents a halo triggered by the battle action. The halo impacts an element in a battle scene of the turn-based battle. The halo is rendered according to the halo rendering information in a process of rendering the battle action based on the battle rendering information.

According to an aspect of the embodiments of this disclosure, a turn-based battle-based information providing method is provided. The method may be performed by servers including a first server and a second server. In the turn-based battle-based information providing method, an initiation request for a battle action is received by a first server from a battle control process. Battle rendering information corresponding to the battle action is generated by processing circuitry of the first server according to the initiation request, the battle action being initiated by a virtual object of a turn-based battle. An invocation request is transmitted by the first server to a second server when the battle action triggers a halo, the invocation request including halo information representing the halo, and the halo impacting an element in a battle scene of the turn-based battle. Halo rendering information is generated by a second server according to the invocation request. The halo rendering information is transmitted to a scene control process that is configured to transmit the halo rendering information to the battle control process. The battle rendering information is transmitted by the first server to the battle control process after receiving a delivery success notification for the halo rendering information from the second server.

According to an aspect of the embodiments of this disclosure, a turn-based battle-based interface display apparatus is provided. The processing circuitry is configured to execute a battle control module and a scene control module. The battle control module is configured to transmit, when a user initiates a battle action of a turn-based battle, an initiation request for the battle action to a first server. The battle control module is configured to receive battle rendering information of the battle action from the first server. The scene control module is configured to receive halo rendering information from a second server, the second server being configured to process a virtual environment, the halo rendering information being generated by the second server according to halo information transmitted by the first server, the halo information representing a halo triggered by the battle action, and the halo impacting an element in a battle scene of the turn-based battle. The battle control module is configured to render the halo according to the halo rendering information in a process of rendering the battle action based on the battle rendering information.

According to an aspect of the embodiments of this disclosure, a computer system is provided, including a client and a server, where the client is configured to perform the turn-based battle-based interface display method described above, and the server is configured to perform the turn-based battle-based information providing method described above.

According to an aspect of the embodiments of this disclosure, a computer device is provided, including a processor and a memory, the memory having a computer program stored therein, and the computer program being loaded and executed by the processor to implement the turn-based battle-based interface display method described above or implement the turn-based battle-based information providing method described above.

The computer device includes a terminal device and a server.

According to an aspect of the embodiments of this disclosure, a non-transitory computer-readable storage medium is provided, having instructions stored therein, and the instructions when executed by a processor cause the processor to perform the turn-based battle-based interface display method described above or perform the turn-based battle-based information providing method described above.

According to an aspect of the embodiments of this disclosure, a computer program product or a computer program is provided, the computer program product or the computer program includes computer instructions, and the computer instructions are stored in a computer-readable storage medium. A processor of a computer device reads the computer instructions from the computer-readable storage medium, and the processor executes the computer instructions, to cause the computer device to perform the turn-based battle-based interface display method described above or perform the turn-based battle-based information providing method described above.

Examples of the technical solutions provided in the embodiments of this disclosure may include the following beneficial effects:

When a client detects that a participant of a turn-based battle initiates battle behavior, the client transmits an initiation request to a first server configured to process the battle behavior and receives battle rendering information configured for rendering the battle behavior transmitted by the first server. In addition, the first server transmits halo information representing a halo triggered by the battle behavior to a second server configured to process a world environment, to receive halo rendering information generated by the second server based on the halo information, and implement an interface display procedure by combining the battle rendering information and the halo rendering information. Namely, environment generation of battle behavior and environment generation of non-battle behavior are no longer performed by two servers respectively. Instead, for the battle behavior, the first server transmits few halo information to the second server, so that even if data related to the environment generation is also processed by the second server for the battle behavior, and a problem that a data transmission amount is great because the second server needs to update and copy entire environment data to the first server can be avoided, which not only greatly reduces a transmission amount of data exchange between the first server and the second server, but can also avoid a redundancy problem that both the first server and the second server maintain one piece of scene data in a manner of maintaining one piece of scene information on a second server side, thereby further reducing maintenance overheads of the server, helping improve the interface display efficiency, and improving the human-machine interaction efficiency.

In addition, by supporting the first server configured to process the battle behavior in delivering the battle rendering information and supporting the second server configured to process the world environment in delivering the halo rendering information, a problem that the client needs to be consider a plurality of rendering information sources when processing the same rendering information because both the first server and second server need to deliver the battle rendering information or the halo rendering information is avoided, thereby reducing pressure of the client in processing the rendering information.

BRIEF DESCRIPTION OF THE DRAWINGS

FIG. 4 is a flowchart of a turn-based battle-based interface display method according to an embodiment of this disclosure.

FIG. 5 is a schematic diagram of a halo in a battle scene according to an embodiment of this disclosure.

DESCRIPTION OF EMBODIMENTS

Before embodiments of this disclosure are described, examples of terms used in this disclosure are explained first. The descriptions of the terms are provided as examples and are not intended to limit the scope of this disclosure.

1. Virtual world may include a virtual world displayed (or provided) by an application program when running on a terminal. The virtual world may be a simulated environment of a real world, or may be a semi-simulated and semi-fictional environment, or may be a completely fictional environment. The virtual world may be any one of a two-dimensional virtual world, a 2.5-dimensional virtual world, and a three-dimensional virtual world, which is not limited in this disclosure. A description is made in the following embodiments by using an example in which the virtual world is a three-dimensional virtual world.

2. Master virtual character may include a movable object played by a player in the virtual world. The master virtual character may be a virtual character, a virtual animal, or a cartoon character, for example, a character or an animal displayed in the three-dimensional virtual world. In some embodiments, the master virtual character is a three-dimensional model created based on a skeletal animation technology. Each master virtual character has its own shape and volume in the three-dimensional virtual world, and occupies a part of space in the three-dimensional virtual world.

3. Pet virtual character may include a movable character controlled by artificial intelligence (AI) in the virtual world. The pet virtual character may be a virtual creature, a virtual animal, a virtual monster, a virtual genie, a virtual pet, or the like.

4. World map may include a plurality of plots. Each plot is a polygonal plot. The polygonal plot may be any one of a square plot, a rectangular plot, or a hexagonal plot. For example, each plot is a square whose size is 50 cm×50 cm. Each plot has its own surface attribute. The surface attribute includes grass, stone, water, or the like. In addition, the plurality of plots included in the world map may be plots of the same type, or may be a combination of various different types of plots.

Figure 1:
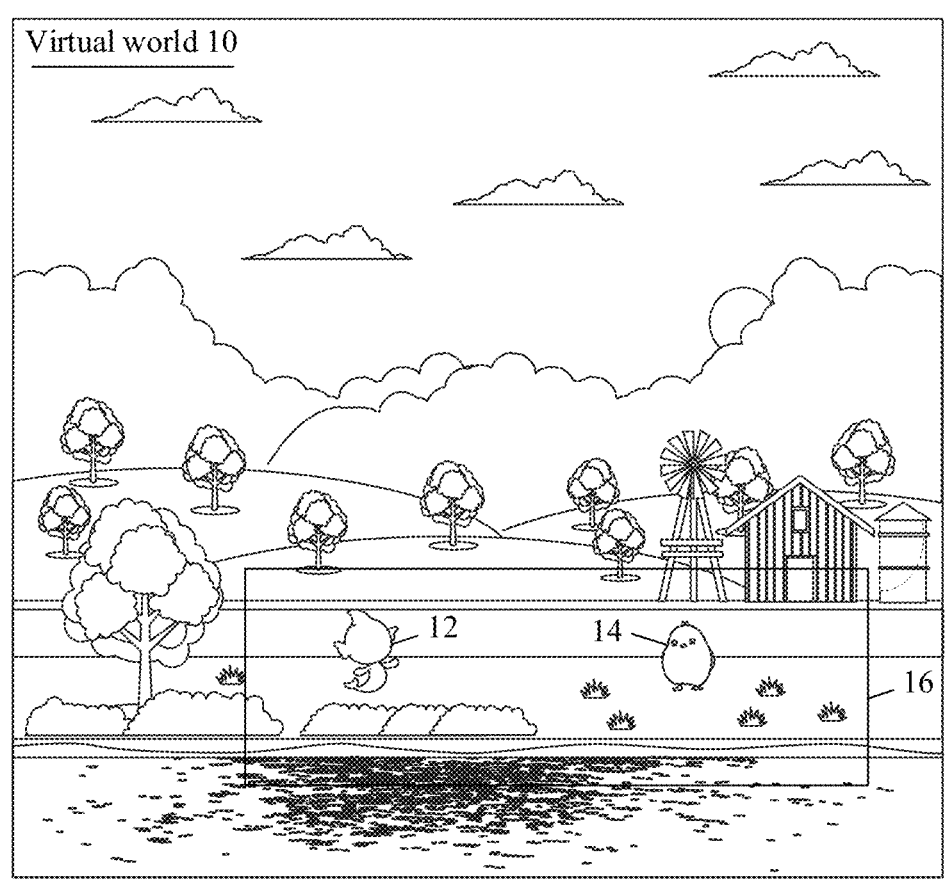
FIG. 1 is a schematic diagram of a world scene according to an embodiment of this disclosure.
Figure 2:
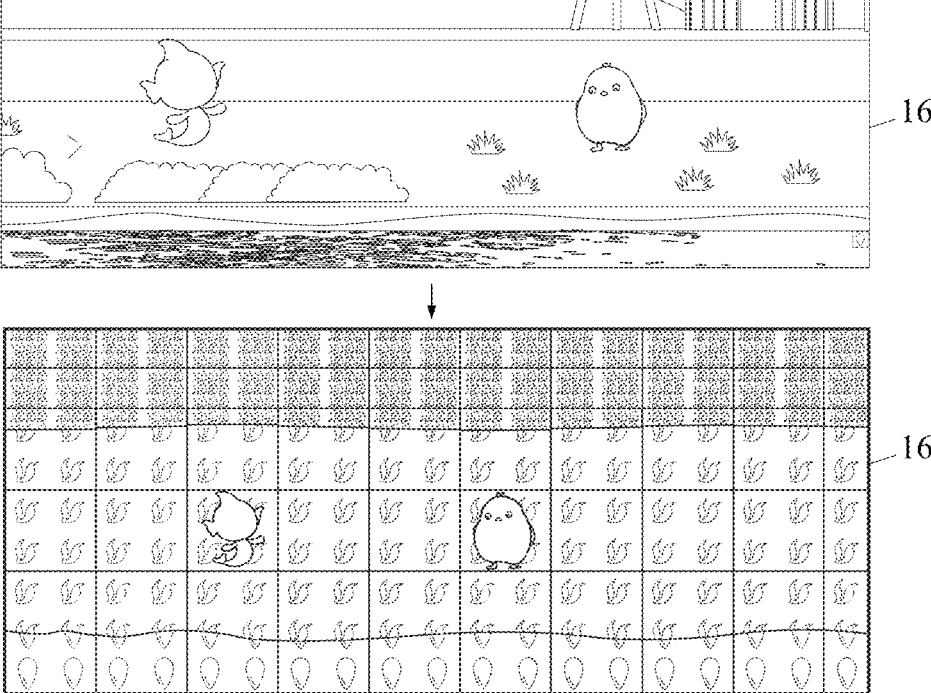
FIG. 2 is a schematic diagram of a battle scene according to an embodiment of this disclosure.

5. Battle map, for example as shown in FIG. 1 and FIG. 2, in a virtual environment 10 (namely, a virtual world), when a first pet virtual character 12 encounters a second pet virtual character 14 at a position in the world map and enters a battle, one or more plots within a specific range using a reference position determined by the first pet virtual character 12 as a center in the world map are determined as a battle map 16. The reference position is a position at which the first pet virtual character 12 is located, or a suitable battle position that is closest to the first pet virtual character 12. In some embodiments, the battle map 16 includes all plots within a circular range with the reference position as a center and a predetermined length as a radius. In some embodiments, the battle map 16 includes all plots within a rectangular range with the reference position as a center and a predetermined length and width.

6. World scene may include a scene corresponding to the world map, and when the world scene is displayed in a user interface, the user interface may display the one or more plots in the world map. For example, the user interface displays one or more plots in which the master virtual character or the pet virtual character is currently located in the world map, and some interface elements related to the displayed plots, the master virtual character, and the pet virtual character. The elements in the embodiments of this disclosure may be configured for forming a scene (for example, the world scene), for example, visible elements such as the plot, the master virtual character, and the pet virtual character.

7. Battle scene may include a scene corresponding to the battle map, and when the battle scene is displayed in the user interface, the user interface may display the battle map, for example, display all or some plots included in the battle map. For example, the user interface displays one or more plots in which the master virtual character or the pet virtual character is currently located in the battle map, and some interface elements related to the displayed plots, the master virtual character, and the pet virtual character.

Switching may be performed between the world scene and the battle scene. For example, switching may be performed from the world scene to the battle scene, or may be performed from the battle scene to the world scene.

When the world scene and the battle scene are displayed, a virtual camera may use different photographing viewing angles. In some embodiments, in the world scene and the battle scene, in addition to the foregoing difference between the photographing viewing angles, allowed user operations may also be different. Through the foregoing manner, a user may distinguish the world scene and the battle scene in perception. However, the world scene and the battle scene share the same world map, and the battle map used by the battle scene is one or more plots in the world map, so that the switching between the world scene and the battle scene does not bring a strong sense of separation, but very smooth and natural switching.

8. Potential energy may include an attribute or an identifier that affects a battle in the virtual world. The potential energy includes at least one of grass, fire, water, rock, ice, electric, poison, light, ghost, dark, normal, fighting, fairy, psychic, bug, flying, dragon, or mechanical potential energy.

9. Halo may include an abstract element that has a capability of affecting at least one visible element of the plot, the master virtual character, or the pet virtual character within a specific range in the virtual world. The abstract element is different from elements in the embodiments of this disclosure, and may be particularly configured for describing the halo to embody and visualize the halo. The halo is an abstract element that appears continuously, randomly, along with the master virtual character, along with the pet virtual character, triggered by an ability, or triggered by a prop in the virtual world. The halo is invisible or visible in the virtual world, for example, a fire halo, a light halo, a healing halo, a buff halo, or the like.

10. A battle procedure changes a world environment: For example, when a turn-based battle is performed between pet virtual characters, an ability cast by each pet virtual character may affect an environment in the virtual world. For example, when the pet virtual character performs a battle in the battle scene, the pet virtual character casts a fire ability, and a hit grassland plot is ignited. In some embodiments, in the battle scene, an ability display effect (namely, the halo) may be rendered by a battle control process through a halo rendering interface, and in the world scene, the ability display effect (namely, the halo) may be rendered by a scene control process through the halo rendering interface. In the battle scene, the halo may be permanently displayed; and in the world scene, displaying of the halo may be canceled after the halo is continuously displayed for a threshold duration, and a plot corresponding to the halo is restored to its original appearance.

Further, when an environment of a plot is changed, the pet virtual character may also be affected.

11. A world environment changes a battle procedure: For example, when a turn-based battle is performed between pet virtual characters, an environment in the virtual world may affect each pet virtual character, for example, affect ability damage of the pet virtual character, or affect an ability display effect of the pet virtual character. For example, the environment in the virtual world includes an environment of a plot and an environment of weather, and the two aspects comprehensively affect degrees at which the pet virtual character dislikes and likes the environment. For example, the degrees at which the pet virtual character dislikes and likes the environment include the following several different levels: strong affinity, weak affinity, non-sensitive, weak resistance, and strong resistance.

If the pet virtual character likes the two environments (the plot and the weather), a strong affinity effect is obtained; if the pet virtual character only likes one environment and does not dislike the other environment, a weak affinity effect is obtained; if the pet virtual character likes one environment and dislikes the other environment, no effect is obtained; if the pet virtual character only dislikes one environment and does not like the other environment, a weak resistance effect is obtained; and if the pet virtual character dislikes both the two environments, a strong resistance effect is obtained.

In the battle procedure, a server or a client needs to obtain the environment periodically, and determine impact of the environment on the pet virtual character.

12. A position change in a turn-based battle: In a related turn-based battle, standing positions of an own pet virtual character and an enemy pet virtual character are fixed, r stand-still. In the embodiments of this disclosure, for example, when a battle is performed between pet virtual characters, both an attacking party and an attacked party are not stand-still, namely, displacement may be generated.

When a pet virtual character serves as an attacking party, active displacement may be generated. If a first position at which the pet virtual character is currently located meets an ability casting condition, the pet virtual character may cast an ability at the first position. If the first position does not meet the ability casting condition, before the ability is cast, the pet virtual character may be controlled to actively move from the first position to a second position meeting the ability casting condition, and the pet virtual character casts the ability at the second position. The second position may be referred to as a valid battle point, and is a position meeting the ability casting condition of the pet virtual character. In some embodiments, after the ability is cast, the pet virtual character may move to a third position, where the third position may be the same as or may be different from the first position. The third position may be referred to as a valid standing point, and is a position at which the pet virtual character is located after casting the ability. In addition, the ability casting condition may be related to factors such as the pet virtual character, the ability, an environment, or the like.

When a pet virtual character serves as an attacked party, passive displacement may be generated, and when the pet virtual character is attacked by an ability, a displacement procedure of being knocked back may be generated. For example, the pet virtual character is currently located at a first position, and when being attacked by an ability at the first position, the pet virtual character may move from the first position to a fourth position, where the fourth position may be determined according to factors such as the pet virtual character serving as the attacked party, a pet virtual character serving as an attacking party, the suffered ability, an environment, or the like.

In addition, as a position of the pet virtual character changes, an environment (including an environment of a plot in which the pet virtual character is located and an environment of weather) in which the pet virtual character is located may also change, affecting a battle of the pet virtual character in subsequent turns.

Figure 3:
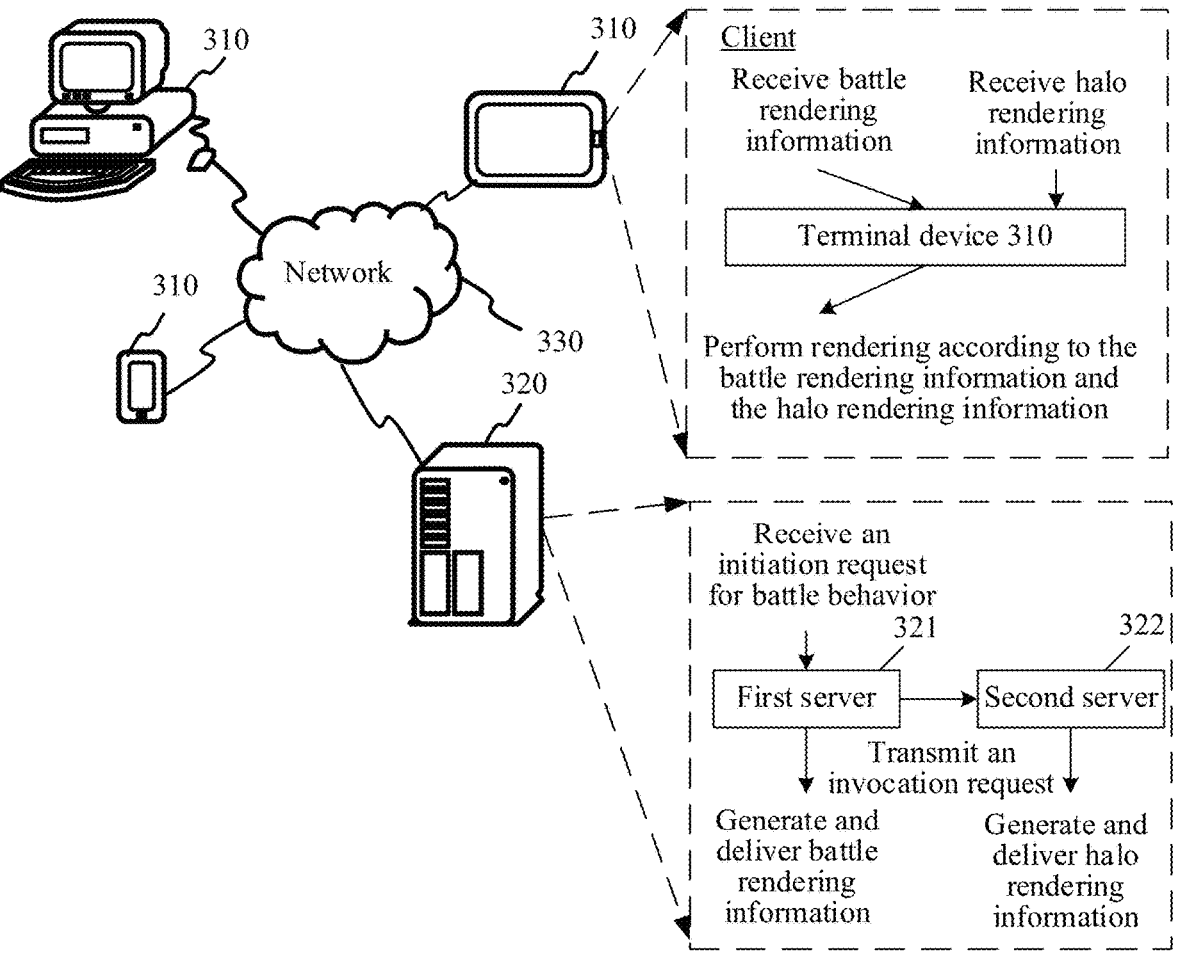
FIG. 3 is a schematic diagram of a solution implementation environment according to an embodiment of this disclosure.

FIG. 3 shows a schematic diagram of a solution implementation environment according to an embodiment of this disclosure. The solution implementation environment may be implemented as an architecture of a computer system, and the implementation environment may include: a terminal device 310 and a server 320.

The terminal device 310 may be an electronic device such as a mobile phone, a tablet computer, a game console, a multimedia player, a personal computer (PC), or the like. A client of an application program may be installed in the terminal device 310, such as a client of a game application program, a simulation learning application program, a virtual reality (VR) application program, an augmented reality (AR) application program, a social application program, an interactive entertainment application program, or the like.

Using a turn-based role-playing game (RPG) as an example, referring to FIG. 3, a client of the turn-based RPG is installed and run in the terminal device 310. The server 320 is configured to provide a backend service to the client of the application program (for example, a game application program) in the terminal device 310. For example, the server 320 may be a backend server of the application program (for example, the game application program). The server 320 may be one server, a server cluster including a plurality of servers, or a cloud computing service center.

Using a turn-based RPG as an example, referring to FIG. 3, the server 320 includes a first server 321 and a second server 322. The first server 321 runs battle behavior processing logic and affinity processing logic, to perform logic processing on a battle operation or an ability and calculate an environment affinity (referred to as an affinity for short) of a pet virtual character.

The second server 322 runs environment processing logic and halo processing logic, to perform logic processing on a world environment of a virtual world and perform logic processing on a halo corresponding to battle behavior.

The terminal device 310 and the server 320 may communicate with each other through a network 330. The network 330 may be a wired network or a wireless network.

For example, referring to FIG. 3, in a battle scene, the terminal device 310 obtains battle rendering information from the first server 321, where the battle rendering information is configured for rendering battle behavior. In addition, the terminal device 310 obtains halo rendering information from the second server 322, where the halo rendering information is configured for rendering a halo. The terminal device 310 then perform displaying and rendering according to the battle rendering information and the halo rendering information.

In a turn-based RPG in the related art, a player plays a virtual character in a realistic world or a virtual world. The turn-based RPG provides two types of maps: a world map and a battle map. In a non-battle scene, the virtual character performs an activity in the world map, for example, exploring, catching a pet virtual character, collecting treasure boxes, collecting virtual props, or the like. In a battle scene, the virtual character controls a caught pet virtual character in the battle map to perform a turn-based battle with an enemy unit (for example, a non-player character (NPC) or a monster controlled by AI in a game, or a pet virtual character caught by another character).

In the related art, because the world map and the battle map are two different maps, for example, two completely different maps, when switching is performed between a world scene (or referred to as the non-battle scene) and the battle scene, map content with a great difference may be displayed in a user interface, and the player may apparently sense a difference between the two different maps, bringing a strong sense of separation. In the related art, to alleviate the sense of separation, a transition animation is generally displayed during switching, but an effect is still not good.

In the embodiments of this disclosure, an innovative turn-based RPG mechanism is provided. The turn-based RPG combines, for example, the related world map and battle map together. The battle map is a submap that is dynamically determined from the world map each time a battle is performed. In this way, when switching is performed between the world scene (or referred to as the non-battle scene) and the battle scene, map content displayed in the user interface is not greatly different, thereby avoiding the sense of separation existing in the related art. In addition, in the turn-based RPG, an environment (weather, time, a plot, or the like) in the virtual world is allowed to affect a master virtual character, a pet virtual character, and a battle procedure, and the master virtual character, the pet virtual character, and the battle procedure also affect the environment in the virtual world, so that the turn-based battle procedure may be organically integrated into the virtual world and forms a whole rather than two separated parts.

The battle procedure of the turn-based RPG may be a single battle, a double battle, or a multi battle, which is not limited in the embodiments of this disclosure. For example, the battle procedure may be as follows:

1. Select a pet virtual character for a battle.
2. Display a battle scene, and select an ability to be used by the pet virtual character.
3. Control a touch control on a touch screen to cast the ability.
4. Display an ability animation effect.

FIG. 4 shows a flowchart of a turn-based battle-based interface display method according to an embodiment of this disclosure. An entity executing the operations of the method may be the terminal device 310 in the solution implementation environment shown in FIG. 3, such as the client of the application program that is installed and run in the terminal device 310. The method may include the following several operations (operation 401 to operation 404):

Operation 401. Transmit, in a case of detecting that a participant of a turn-based battle initiates battle behavior, an initiation request for the battle behavior to a first server.

In an embodiment, the client runs a battle control process, and the battle control process transmits the initiation request for the battle behavior to the first server in a case of detecting that the participant initiates the battle behavior.

In this embodiment of this disclosure, the battle control process is a process configured to process content associated with the battle scene. For example, the battle control process may implement rendering of the foregoing battle procedure, for example, render behavior of the pet virtual character and the enemy unit in the battle procedure.

The turn-based battle in this embodiment of this disclosure is run under the turn-based RPG mechanism provided in the embodiments of this disclosure. The turn-based battle may be a turn-based battle performed between the pet virtual character and the enemy unit. For example, the turn-based battle may include three turn battles, and in each turn battle, the pet virtual character and the enemy unit may attack the other party once in turn. After the three turn battles are completed, the turn-based battle ends. Alternatively, when one of the pet virtual character and the enemy unit is defeated, the turn-based battle ends, which is not limited in this embodiment of this disclosure.

The participant (or virtual object) of the turn-based battle may be the pet virtual character, or may be the enemy unit of the pet virtual character. The battle behavior (or battle action) may be battle behavior to be executed by the participant in response to a battle control operation of the player, for example, behavior such as cast an ability, normal attack, escape, use a virtual prop, defend, or the like. The battle behavior may alternatively be battle behavior to be executed by the participant under control of AI, which is not limited in this embodiment of this disclosure.

The first server is a backend server of the application program, and corresponds to the battle control process. The first server may execute battle processing logic, to process a control signal generated by the player in the battle scene, to prompt the foregoing battle procedure. The first server may be further configured to process the initiation request for the battle behavior. For example, the first server may execute battle behavior processing logic, to perform logic processing on the battle behavior to generate battle rendering information, so as to render and display the battle behavior. The first server is the same as the description in the foregoing embodiment, and details are not described herein again.

The initiation request for the battle behavior may be configured for requesting to perform a rendering procedure on the battle behavior and obtain information required for rendering the battle behavior, namely, the battle rendering information. The initiation request may include identification information of the battle behavior, such as identification information of an ability, identification information of a virtual prop, or the like.

In an embodiment, in addition to the battle control process, the client further runs a scene control process.

In this embodiment of this disclosure, the scene control process is a process configured to process content associated with the world scene. For example, the scene control process may render an activity of the master virtual character in the world scene. The scene control process and the battle control process are two independent and different processes.

In some embodiments, when the master virtual character encounters an enemy unit, the player may choose to start a turn-based battle. In an example, in a start procedure of the turn-based battle, a battle picture display procedure of the turn-based battle may be as follows:

1. In a case of entering the turn-based battle, the scene control process obtains basic information corresponding to a participant of the turn-based battle and environment information corresponding to the battle scene, and transmit the basic information and the environment information to the second server.

The basic information may be required character information in the battle, namely, information such as a health point, a level, an attribute, or an ability of the participant, or an attribute or an ability of the enemy unit. For example, the basic information may include information such as the level and the health point of the master virtual character, an attribute and an ability of a pet virtual character used by the master virtual character, and the attribute and the ability of the enemy unit.

The environment information corresponding to the battle scene may be environment information corresponding to the battle map, such as plot information, time information, weather information, or the like. In some embodiments, in the first turn battle, an environment affinity between the pet virtual character and the battle scene may be determined according to the environment information, to determine a final buff or debuff effect of an ability corresponding to the pet virtual character in the first turn battle.

The second server is a backend server of the application program, and corresponds to the scene control process. The second server may execute scene processing logic to process a control signal generated by the player in the world scene, to prompt and render the activity of the master virtual character in the world scene. The second server is the same as the description in the foregoing embodiment, and details are not described herein again.

After receiving the basic information and the environment information, the second server transmits the basic information and the environment information to the first server.

2. The battle control process receives a battle picture of the turn-based battle from the first server. The battle picture of the turn-based battle is a picture generated by the first server according to the basic information and the environment information that are transmitted by the second server.

The battle picture may be a picture in which the pet virtual character battles with the enemy unit in the battle scene. The first server may execute the battle behavior processing logic, to generate the battle picture (or battle picture rendering information) based on the basic information and the environment information that are from the second server, and deliver the battle picture to the battle control process.

3. The battle control process displays the battle picture of the turn-based battle.

In some embodiments, the battle control process may directly display the battle picture in the user interface, or render the battle picture according to the battle picture rendering information, which is not limited in this embodiment of this disclosure.

In the foregoing battle picture display procedure, with the assistance of the basic information and the environment information transmitted by the scene control process, the second server can learn a status of the participant and a status of the battle scene more intuitively, and with the assistance of an interaction procedure between the first server and the second server, the battle control process interacting with the first server can obtain a battle picture that better meets a current battle status, thereby improving the accuracy in obtaining the battle picture, helping render and display a more real battle picture on the client, and improving the human-machine interaction efficiency.

Operation 402. Receive battle rendering information from the first server, where the battle rendering information is configured for rendering the battle behavior. The battle rendering information may be a series of behavior control parameters related to the battle behavior in a time dimension, and the pet virtual character may be controlled to complete a set of actions or performance according to the behavior control parameters.

In an embodiment, the client runs the battle control process, and the battle control process further receives the battle rendering information from the first server in addition to transmitting the initiation request for the battle behavior to the first server.

For example, in a case that the battle behavior is casting an ability, the battle control process controls, according to the battle rendering information, the pet virtual character to complete a set of ability casting actions, to complete rendering of ability casting.

Operation 403. Receive halo rendering information from a second server, where the halo rendering information is information generated by the second server according to halo information transmitted by the first server, the halo information is configured for representing a halo triggered by the battle behavior, and the halo has impact on an element in a battle scene of the turn-based battle.

The halo rendering information may be a series of element control parameters related to the halo in the time domain, and some elements (for example, a fire element) may be controlled to complete impact on an environment (for example, a plot) according to the element control parameters. For example, in a case that the halo is a fire halo, according to corresponding halo rendering information, a conversion procedure that a fire element converts a plot from a grass attribute to a fire attribute may be obtained through rendering. The element affected by the halo in the battle scene may be at least one visible element such as the plot, the master virtual character, or the pet virtual character.

In some embodiments, the second server runs halo processing logic, and the halo rendering information corresponding to the halo may be obtained by performing logic processing on the halo represented by the halo information (for example, identification information of the halo).

In an embodiment, the scene control process that is run in the client receives the halo rendering information from the second server.

For example, after generating the halo rendering information, the second server transmits the halo rendering information to the scene control process.

In an example, in a case of determining that the battle behavior triggers the halo, the first server transmits the halo information to the second server. In a case of determining that the battle behavior cannot trigger the halo, logic processing is only performed on the battle behavior, to determine information such as caused damage, added buff, generated displacement, or the like, so as to generate the battle rendering information.

In some embodiments, the first server further correspondingly maintains a relationship table between battle behavior and halos, and may determine, by querying the relationship table, whether the battle behavior can trigger the halo. In a case that the halo is triggered, the halo information of the halo may be further determined according to the relationship table.

In an embodiment, after receiving the halo rendering information, the scene control process that is run in the client transmits the halo rendering information to the battle control process.

For example, after receiving the halo rendering information, the scene control process may buffer the halo rendering information first, and after the halo rendering information is buffered, transmit the halo rendering information to the battle control process. In this way, the battle control process may first obtain the battle rendering information and then obtain the halo rendering information, to sequentially implement a display procedure of the battle behavior and a rendering procedure of the halo (avoiding a problem of first rendering the halo without a sign), so that connection between displaying of the battle behavior and displaying of the halo becomes more natural and smoother.

Operation 404. Render a halo according to the halo rendering information in a procedure of rendering the battle behavior based on the battle rendering information.

In an embodiment, the client implements a halo rendering procedure through the battle control process.

In some embodiments, after receiving the halo rendering information transmitted by the scene control process, the battle control process renders the halo based on the halo rendering information.

For example, in a case of receiving the battle rendering information and the halo rendering information, the battle control process renders the halo according to the halo rendering information in the procedure of rendering the battle behavior according to the battle rendering information. In a case of only receiving the halo rendering information, the battle control process does not render the halo.

In an example, the battle control process and the scene control process share the same halo rendering interface. In the turn-based battle (namely, the battle scene), the battle control process invokes the halo rendering interface to render the halo according to the halo rendering information. After the turn-based battle ends, the scene control process, replacing the battle control process, invokes the halo rendering interface, completes rendering of the halo in a connection manner.

For example, the scene control process renders the halo according to the buffered halo rendering information. For example, after the turn-based battle ends, the scene control process invokes the halo rendering interface, to render and display a remaining halo corresponding to the turn-based battle according to the buffered halo rendering information, where the remaining halo is a halo that still needs to be displayed in the virtual world in all the halo rendering information (for example, in the turn-based battle, rendering of some halos is canceled).

Alternatively, in the procedure that the battle control process performs halo rendering, the scene control process performs statistics collection on the halo according to the buffered halo rendering information and dynamically updates the remaining halo corresponding to the turn-based battle, to render and display the remaining halo corresponding to the turn-based battle in a seamless connection manner after the turn-based battle ends.

In the foregoing procedure, a procedure that the scene control process first buffers and then renders the halo rendering information is described. The scene control process, serving as a process configured to process content associated with the world scene, needs to have the scene display stability, and with the assistance of the buffer procedure, the scene control process can first buffer the halo rendering information related to the halo triggered by the battle behavior, to avoid a problem that the halo cannot be normally rendered in a halo rendering procedure implemented through the halo rendering information buffered by the process when the battle control process cannot render the halo based on the halo rendering information.

In some embodiments, after the turn-based battle ends, the battle control side may synchronize settlement data of the turn-based battle to the scene control side at a time. For example, after the turn-based battle ends, the first server may synchronize the settlement data such as a health point consumption status, an experience value obtaining status, a virtual resource consumption status, or the like in the turn-based battle to the second server at a time.

In an example, a display occasion and a display position of the halo may be indicated through a battle rendering label corresponding to the battle behavior. The battle rendering label may include identification information of the turn-based battle, the identification information of the battle behavior, the identification information of the halo, a position corresponding to the halo (for example, a plot or an affected character), rendering details of the battle behavior, or the like. The procedure may include the following content:

1. The scene control process receives a battle rendering label from the second server. The battle rendering label is a label generated by the first server according to the battle behavior in a case that the battle behavior meets a condition for triggering the halo.

In a case of determining that the battle behavior triggers the halo, the first server generates the battle rendering label of the battle behavior, generates an invocation request according to the battle rendering information and the halo information, and then transmits the invocation request to the second server in a remote procedure call (RPC) manner. The second server then transmits the battle rendering label to the scene control process.

2. The scene control process transmits the battle rendering label to the battle control process.

After receiving the battle rendering label and the halo rendering information from the second server, the scene control process transmits the battle rendering label and the halo rendering information to the battle control process together.

3. The battle control process renders, according to the display occasion and the display position that are indicated by the battle rendering label, the halo according to the halo rendering information in the procedure of rendering the battle behavior according to the battle rendering information.

For example, the battle control process determines the display occasion and the display position of the halo according to the rendering details of the battle behavior and the position corresponding to the halo in the battle rendering label, and renders and displays the halo at the display position (such as a plot) when the display occasion is reached in the procedure of rendering and displaying the battle behavior. For example, after a casting procedure of an ability triggering the halo is rendered, rendering of the halo is performed, to implement natural connection between rendering of the casting procedure and the rendering of the halo.

For example, an example in which the halo has impact on a plot in the virtual world is used.

In a case that an initial type of the plot is a grass type, the type of the plot is converted into a fire type under impact of a halo of a fire type, namely, a picture that grass on the plot is burnt is rendered and displayed; in a case that an initial type of the plot is a water type, the type of the plot is converted into an ice type under impact of a halo of an ice type, namely, a picture that water on the plot is frozen is rendered and displayed; or in a case that an initial type of the plot is a rock type, the type of the plot is converted into a grass type under impact of a halo of a grass type, namely, a picture that grass is grown on the plot is rendered and displayed, which is not limited in the embodiments of this disclosure.

Figure 6:
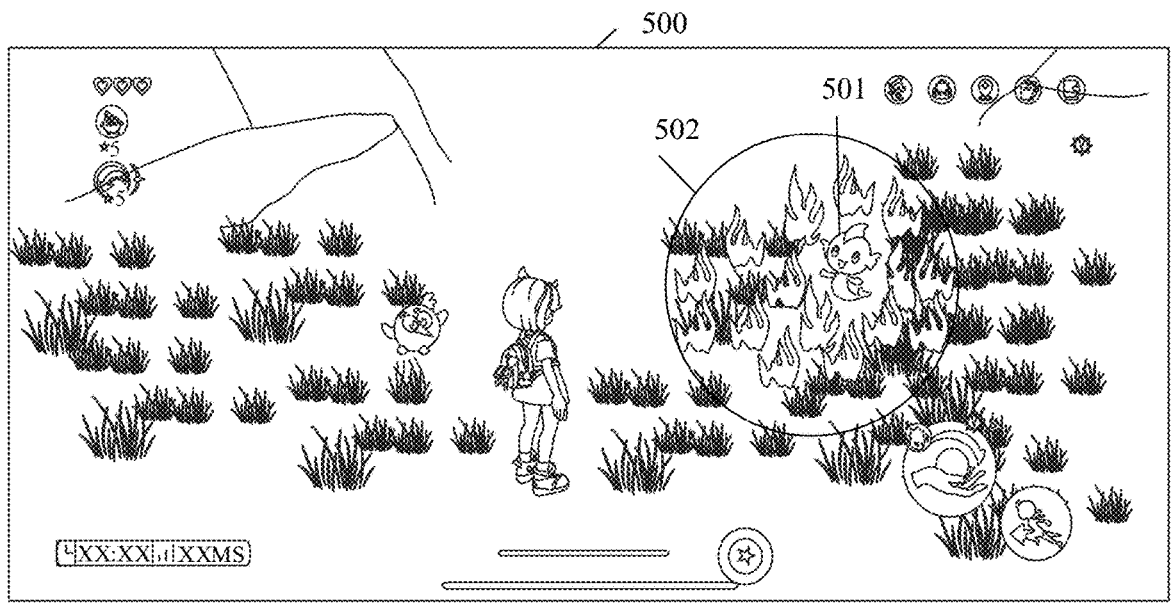
FIG. 6 is a schematic diagram of a halo in a world scene according to an embodiment of this disclosure.

For example, referring to FIG. 5 and FIG. 6, in a battle scene 500, when a pet virtual character 501 of a fire attribute attacks, a spheroidal fire halo 502 with a radius of 4 meters may be added to a position of the pet virtual character, and the spheroidal fire halo 502 converts each plot within the spheroidal fire halo 502 from a grass type to a fire type, namely, ignites grassland within the spheroidal fire halo 502. In some embodiments, when the turn-based battle ends, if the spheroidal fire halo 502 belongs to the remaining halo, the scene control process may also render and display the spheroidal fire halo 502 at the position of the virtual character 501 and render and display that the grassland within the spheroidal fire halo 502 is ignited.

In this embodiment of this disclosure, when the pet virtual character serves as an attacking party, active displacement may be generated. When the pet virtual character serves as an attacked party, passive displacement may be generated, and when the pet virtual character is attacked by an ability, a displacement procedure of being knocked back may be generated. As the position of the pet virtual character changes, an environment (including an environment of a plot in which the pet virtual character is located and an environment of weather) in which the pet virtual character is located may also change, affecting a battle of the pet virtual character in subsequent turns. Therefore, in each turn battle, an environment affinity (referred to as an affinity for short, namely, the foregoing affinity effect) between the pet virtual character and the virtual world needs to be re-determined, which may include the following content.

1. The battle control process transmits a rendering end notification for the battle behavior to the first server.

In some embodiments, after the battle behavior and the halo are rendered, the battle control process transmits the rendering end notification for the battle behavior to the first server. The rendering end notification is configured for informing the first server of a result that the battle behavior and the halo are rendered.

After receiving the rendering end notification, the first server generates a request for obtaining updated environment information and transmits the request for obtaining updated environment information to the second server, to obtain the updated environment information. After obtaining the updated environment information, the first server determines an affinity between the participant and the updated environment information according to the updated environment information, where the affinity has impact on ability power of the participant. The request for obtaining updated environment information may include the identification information corresponding to the battle behavior, information about a plot affected by the halo, or the like, and the updated environment information is environment information of the battle scene after being affected by the halo, such as an attribute of the plot after being affected by the halo. The first server may obtain the updated environment information corresponding to the halo according to the halo information.

2. The battle control process receives an affinity rendering animation from the first server. The affinity rendering animation is an animation generated by the first server according to the updated environment information transmitted by the second server, the updated environment information is the environment information of the battle scene after being affected by the halo, the affinity rendering animation is configured for representing the affinity between the participant and the updated environment information, and the affinity has impact on the ability power of the participant.

In this embodiment of this disclosure, the environment information may include weather information, plot information, and time information. The first server may determine an affinity between the participant and an environment in combination with the environment information and an attribute of the participant. For example, weather potential energy and plot potential energy corresponding to the participant may be first obtained, and the affinity between the participant and the environment is determined according to the weather potential energy and the plot potential energy in combination with attribute information of the participant. The weather potential energy may be determined according to the weather information and the time information. For example, a sunny day at night provides "ghost" potential energy, and a sunny day in the morning provides "light" potential energy. The plot potential energy is determined by a type of a plot in which the participant is located. For example, a plot of a grass attribute includes "grass" potential energy.

In some embodiments, degrees at which the participant dislikes and likes the environment include the following several different levels: strong affinity, weak affinity, non-sensitive, weak resistance, and strong resistance.

If the attribute of the participant matches both the weather potential energy and the plot potential energy (namely, the participant likes both the plot and the weather), a strong affinity effect is obtained, and the affinity is added by 2; if the attribute of the participant matches only one of the weather potential energy and the plot potential energy, and is not resistant to the other potential energy (namely, the participant only likes one of the plot and the weather, and does not dislike the other), a weak affinity effect is obtained, and the affinity is added by 1; if the attribute of the participant matches only one of the weather potential energy and the plot potential energy, and is resistant to the other potential energy (namely, the participant only likes one of the plot and the weather, and dislikes the other), no effect is obtained, and the affinity is added by 0; if the attribute of the participant is resistant to one of the weather potential energy and the plot potential energy, and does not match the other potential energy (namely, the participant only dislikes one of the plot and the weather, and does not like the other), a weak resistance effect is obtained, and the affinity is reduced by 1; and if the attribute of the participant is resistant to both the weather potential energy and the plot potential energy (namely, the participant dislikes both the plot and the weather), a strong resistance effect is obtained, and the affinity is reduced by 2.

If the affinity corresponding to the participant is a positive number, it is considered that environment affinity of the participant is triggered, buff is added to the battle behavior of the participant, for example, increasing an ability range, ability power, an ability attack effect, or the like. If the affinity corresponding to the participant is a negative number, it is considered that the participant is resistant to the environment, and debuff is added to the battle behavior of the participant, for example, decreasing the ability range, the ability power, the ability attack effect, or the like. If the affinity corresponding to the participant is 0, no adjustment is performed on an impact capability of the battle behavior of the participant.

By using the same method as in the foregoing, the first server may obtain the affinity between the participant and the updated environment information, and further generate the affinity rendering animation according to the affinity. In some embodiments, different affinities corresponding to different affinity rendering animations. For example, an affinity rendering animation corresponding to strong affinity is a laugh face, an affinity rendering animation corresponding to weak affinity is a smile face, and an affinity rendering animation corresponding to strong resistance is an angry face. The affinity rendering animation may be an icon, a dynamic icon, an animation, or the like, which is not limited in this embodiment of this disclosure.

The first server delivers the generated affinity rendering animation to the battle control process.

3. The battle control process displays the affinity rendering animation.

After receiving the affinity rendering animation, the battle control process may display the affinity rendering animation at a position near the participant.

Figure 7:
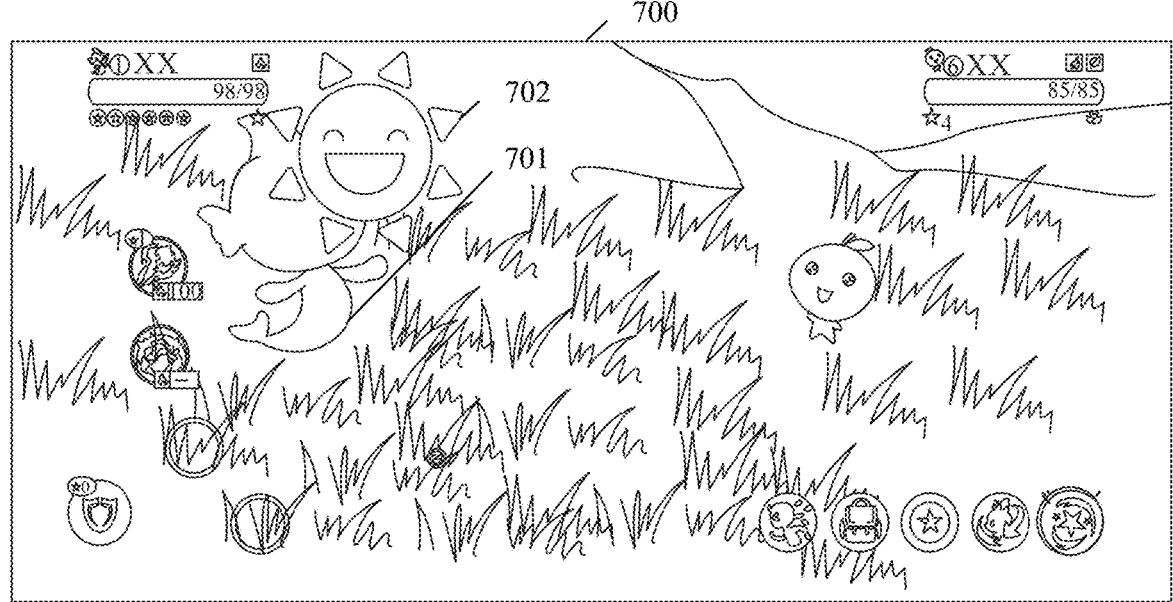
FIG. 7 and FIG. 8 show schematic diagrams of an affinity rendering animation.

For example, referring to FIG. 7, in a battle scene 700, a strong affinity relationship exists between a pet virtual character 701 of a fire attribute and the environment, and the battle control process displays an affinity rendering animation 702 corresponding to strong affinity above the pet virtual character 701, where the affinity rendering animation 702 is a sun with a laugh face.

Figure 8:
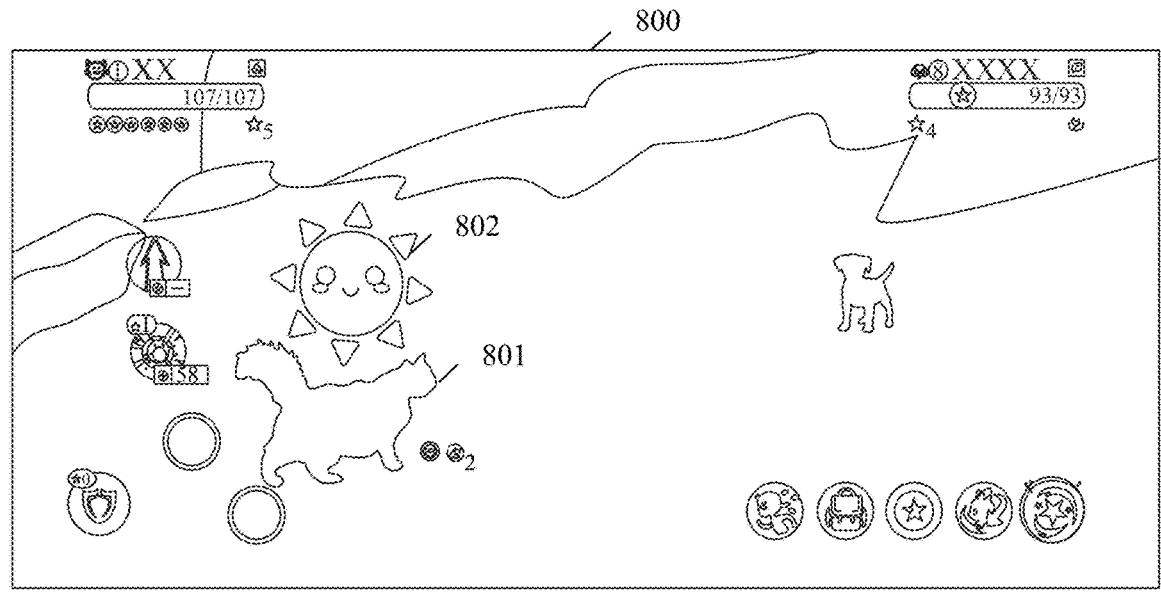

In another example, referring to FIG. 8, in a battle scene 800, a weak affinity relationship exists between a pet virtual character 801 of a light attribute and the environment, and the battle control process displays an affinity rendering animation 802 corresponding to weak affinity above the pet virtual character 802, where the affinity rendering animation 802 is a sun with a smile face.

Figure 9:
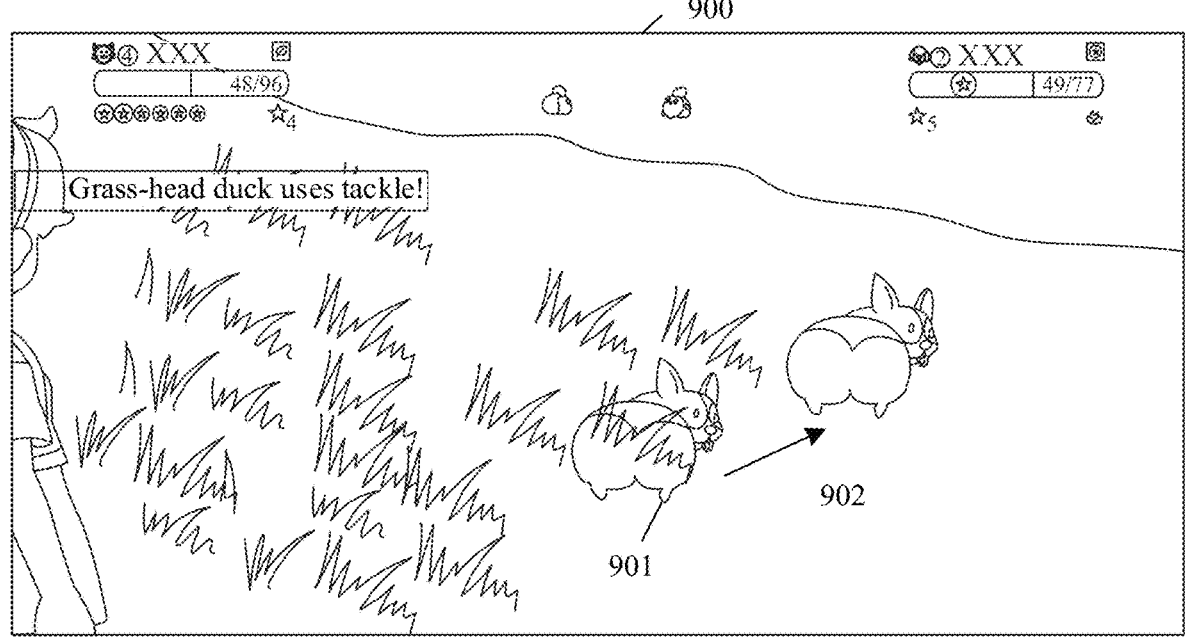
FIG. 9 and FIG. 10 show schematic diagrams of an ability affected by an environment.
Figure 10:
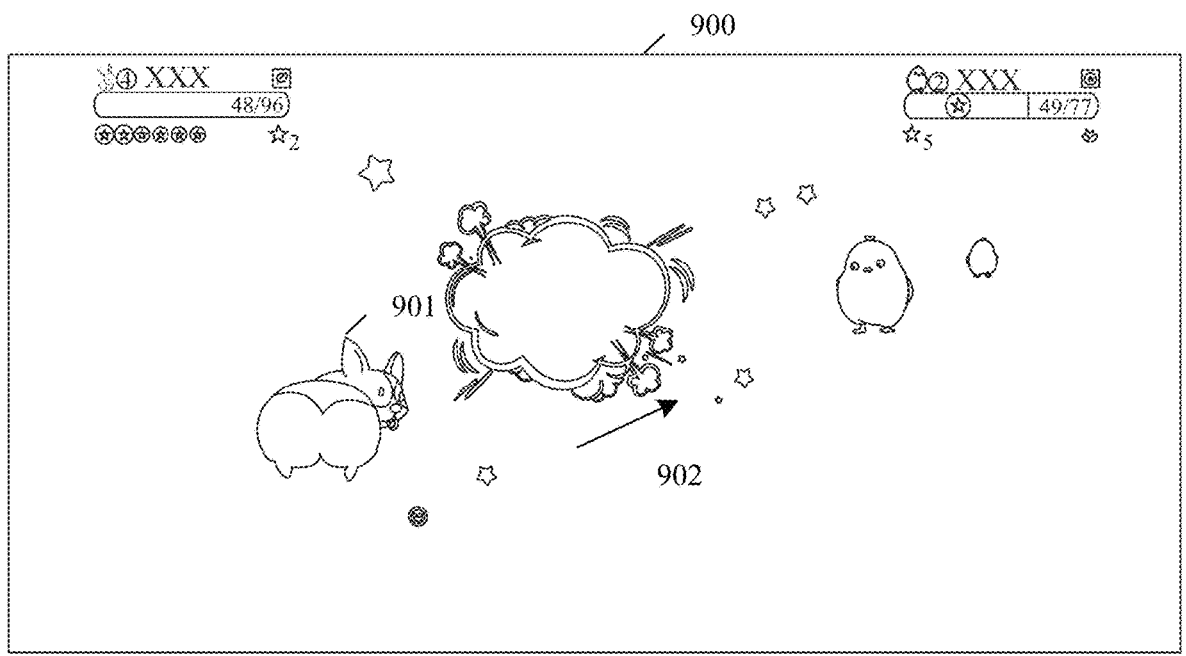

In another example, referring to FIG. 9 and FIG. 10, in a battle scene 900, a pet virtual character 901 of a rock attribute casts an ability 902 of the rock attribute (for example, an active tackle) to attack an enemy unit on grassland, and because the pet virtual character 901 is non-sensitive to the environment, no adjustment is performed on the ability 902 (namely, an ordinary tackle). When the pet virtual character 901 moves onto a rock plot and casts the ability 902 again to attack the enemy unit, because the relationship between the pet virtual character 901 and the environment is changed from non-sensitive to strong affinity, so buff is added to an effect of the ability 902, for example, power of the ability 902 is increased by 50%, and a sandstone special effect is added to the ability 902 (namely, a tackle with the sandstone special effect and increased power).

In the foregoing content of determining the environment affinity, the battle control process displays the affinity rendering animation. In addition to rendering the halo according to the halo rendering information, the battle control process further receives the affinity rendering animation generated according to the updated environment information transmitted between the first server and the second server after the battle behavior is rendered, so that an environment status of the battle scene after being affected by the halo can be presented in a more timely manner through the affinity rendering animation. In this way, the realness of the displayed picture is greatly improved, and the picture presentation effect can be enriched, thereby making the game more interesting, helping the player decide a next battle status through the affinity rendering animation, and improving the human-machine interaction efficiency.

Based on the above, according to the technical solutions provided in the embodiments of this disclosure, environment generation of battle behavior and environment generation of non-battle behavior are no longer performed by two servers respectively. Instead, for the battle behavior, the first server transmits few halo information to the second server, so that even if data related to the environment generation is also processed by the second server for the battle behavior, and a problem that a data transmission amount is great because the second server needs to update and copy entire environment data to the first server can be avoided, which not only greatly reduces a transmission amount of data exchange between the first server and the second server, but can also avoid a redundancy problem that both the first server and the second server maintain one piece of scene data in a manner of maintaining one piece of scene information on a second server side, thereby further reducing maintenance overheads of the server, helping improve the interface display efficiency, and improving the human-machine interaction efficiency.

In addition, by supporting the battle control process in executing the battle behavior processing logic and supporting the scene control process in executing the halo processing logic, different processes implement logic execution procedures in a more targeted manner, and through decoupling between the halo processing logic and the battle behavior processing logic, the service logic independence is improved, and the maintenance and expansion difficulty of the turn-based battle are further reduced. Meanwhile, because underlying code that originally belongs to the first server or the second server does not need to be compatible with both the first server and the second server, the code development difficulty is greatly reduced, thereby helping improve the interaction efficiency between the client and the server and reducing the system maintenance costs.

In addition, in the turn-based battle, by supporting the first server in transmitting the halo information configured for generating the halo rendering information to the second server to cause the second server to transmit the halo rendering information to the scene control process configured to process content associated with the world scene in the client, the scene control process provides the halo rendering information to the battle control process in the client, and information exchange between the battle control side and the scene control side is implemented, so that consistent performance may be kept between the battle control side and the scene control side, thereby improving an integration degree between the battle control side and the scene control side.

In addition, a procedure of rendering the halo by combining the battle rendering label, the battle rendering information, and the halo rendering information is described, by indicating the display position and the display occasion of the halo through the battle rendering label, a data transmission amount may be reduced, and connection between a rendering procedure of the battle behavior and a rendering procedure of the halo becomes natural and smooth, thereby reducing a data transmission amount in each interaction procedure, and improving a battle rendering effect. Besides, a halo rendering status is synchronized between the battle control side and the scene control side, the integration between the world scene and the battle scene is further improved, thereby resolving a problem of processing duplicated data on the battle control side and the scene control side while improving the realness of the displayed picture.

Figure 11:
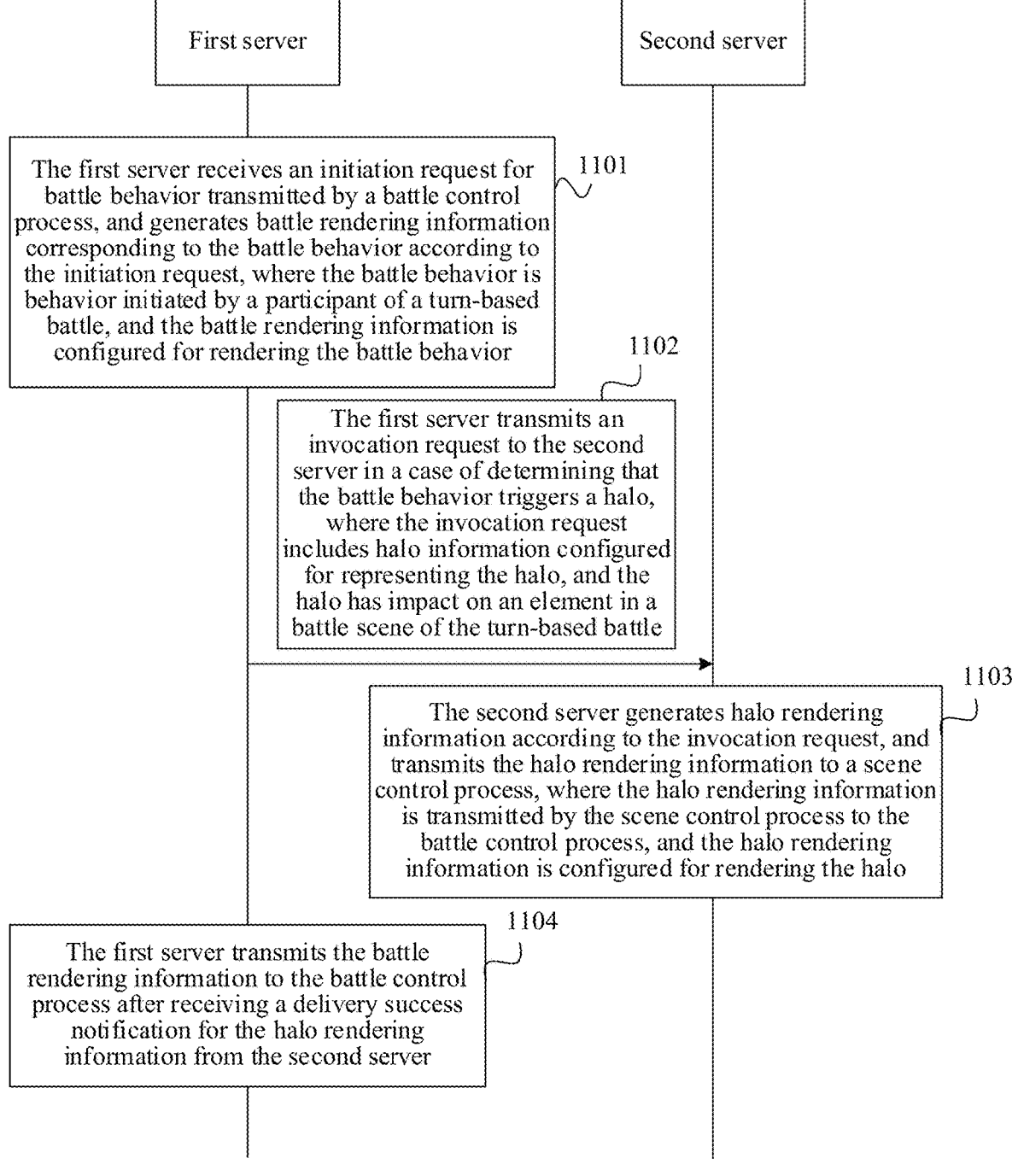
FIG. 11 is a flowchart of a turn-based battle-based information providing method according to an embodiment of this disclosure.

FIG. 11 shows a flowchart of a turn-based battle-based information providing method according to an embodiment of this disclosure. An entity executing the operations of the method may be the server 320 in the solution implementation environment shown in FIG. 3, such as the first server 321 and the second server 322. The method may include the following several operations (operation 1101 to operation 1104):

Operation 1101. The first server receives an initiation request for battle behavior transmitted by a battle control process, and generates battle rendering information corresponding to the battle behavior according to the initiation request, where the battle behavior is behavior initiated by a participant of a turn-based battle, and the battle rendering information is configured for rendering the battle behavior.

The initiation request for the battle behavior is configured for requesting to render the battle behavior and obtain information required for rendering the battle behavior, namely, the battle rendering information. The initiation request may include identification information of the battle behavior, such as identification information of an ability, identification information of a virtual prop, or the like.

The first server may obtain data related to the battle behavior according to the identification information of the battle behavior. The first server may execute battle behavior processing logic, to perform logic processing on the battle behavior, so as to generate the battle rendering information. The first server may be the same as the description in the foregoing embodiment, and details are not described herein again.

The turn-based battle in this embodiment of this disclosure is run under the turn-based RPG mechanism provided in the embodiments of this disclosure. The turn-based battle may be a turn-based battle performed between the pet virtual character and the enemy unit. The participant of the turn-based battle may be the pet virtual character, or may be the enemy unit of the pet virtual character. For example, when the master virtual character encounters an enemy unit, the player may choose to start a turn-based battle.

In an example, in a start procedure of the turn-based battle, a battle picture providing procedure of the turn-based battle may be as follows:

1. The second server receives basic information corresponding to the participant of the turn-based battle and environment information corresponding to a battle scene that are transmitted by the scene control process.

In some embodiments, in a case of determining to start the turn-based battle, the scene control process pulls the basic information corresponding to the participant and the environment information corresponding to the battle scene, and uploads the basic information and the environment information to the second server.

2. The second server transmits the basic information and the environment information to the first server.

After receiving the basic information and the environment information, the second server transmits the basic information and the environment information to the first server.

3. The first server generates a battle picture of the turn-based battle according to the basic information and the environment information, and transmits the battle picture of the turn-based battle to the battle control process.

The battle picture may be a picture in which the pet virtual character battles with the enemy unit in the battle scene. After receiving the battle picture of the turn-based battle, the battle control process may display the battle picture of the turn-based battle in the user interface.

Operation 1102. The first server transmits an invocation request to the second server in a case of determining that the battle behavior triggers a halo, where the invocation request includes halo information configured for representing the halo, and the halo has impact on an element in a battle scene of the turn-based battle.

After receiving the initiation request for the battle behavior, the first server further detects whether the battle behavior triggers a halo. In a case of determining that the battle behavior triggers a halo, the first server generates the invocation request according to the halo information, and transmits the invocation request to the second server in an RPC manner. In a case of determining that the battle behavior does not trigger a halo, the first server does not generate the invocation request and only generates the battle rendering information.

Operation 1103. The second server transmits generates halo rendering information according to the invocation request, and transmits the halo rendering information to a scene control process, where the halo rendering information is transmitted by the scene control process to the battle control process, and the halo rendering information is configured for rendering the halo.

After receiving the invocation request, the second server determines the halo according to the halo information in the invocation request, and performs logic processing on the halo to generate the halo rendering information. The second server transmits the halo rendering information to the scene control process, to forward the halo rendering information to the battle control process through the scene control process.

In an example, after the receiving the invocation request, the second server first determines a plot corresponding to the halo, and then determines whether a historical halo exists in the plot corresponding to the halo. If a historical halo already exists in the plot corresponding to the halo, the second server generates the halo rendering information according to a relationship between the historical halo and the halo; in a case that a covering relationship exists between the historical halo and the halo, the halo rendering information is configured for canceling impact of the historical halo on the plot and adding impact of the halo on the plot; or in a case that a mutually exclusive relationship exists between the historical halo and the halo, the halo rendering information is configured for keeping impact of the historical halo on the plot.

For example, adding a halo of a water attribute when a halo of a fire attribute exists in the plot may involve covering logic, namely, the halo of the fire attribute and impact thereof are canceled on the plot, and the halo of the water attribute and impact thereof are added on the plot. Adding a halo of a fire attribute when a halo of a water attribute exists in the plot may involve mutually exclusive logic, namely, impact of the historical halo on the plot is kept continuously.

If no historical halo exists in the plot corresponding to the halo, in a case that a type of the plot supports effectiveness of the halo (for example, a plot of a grass attribute supports a halo of a fire attribute), the halo rendering information is generated, and in a case that the type of the plot does not support the effectiveness of the halo (for example, a plot of a water attribute does not support the halo of the fire attribute), the halo rendering information is not generated.

In the foregoing procedure, with the assistance of a comparison status of the halo and the historical halo, the second server decides a generation status of the halo rendering information differently. When the relationship between the historical halo and the halo is the covering relationship, the halo rendering information generated by the second server is configured for canceling the impact of the historical halo on the plot and adding the impact of the halo on the plot, so that the current halo can be utilized to present a battle status more vividly and timely, thereby avoiding the limitation that the halo is not displayed vividly due to displaying of the historical halo; and when the relationship between the historical halo and the halo is the mutually exclusive relationship, the halo rendering information generated by the second server is configured for keeping the impact of the historical halo on the plot, so that a problem of picture display separation caused by exclusion between the battle status and a virtual scene display status is avoided, and a scene rendering procedure is implemented while keeping the realness of the displayed scene by considering the historical halo and the halo corresponding to the current battle comprehensively.

Operation 1104. The first server transmits the battle rendering information to the battle control process after receiving a delivery success notification for the halo rendering information from the second server.

After transmitting the halo rendering information to the scene control process, the second server transmits the delivery success notification to the first server, to inform the first server that the halo rendering information is delivered successfully and the battle rendering information may be transmitted to the battle control process. In this way, it may be ensured that the battle control process receives the halo rendering information and the battle rendering information at approximately the same time. The battle control process may further render the halo according to the halo rendering information in a procedure of rendering the battle behavior according to the battle rendering information.

In an example, a display occasion and a display position of the halo may be indicated through a battle rendering label corresponding to the battle behavior, and a providing procedure of the battle rendering label may be as follows:

1. The first server generates a battle rendering label according to the battle behavior in a case of determining that the battle behavior triggers the halo, where the battle rendering label is configured for indicating a display occasion and a display position of the halo.

The battle rendering label may include identification information of the turn-based battle, the identification information of the battle behavior, identification information of the halo, a position corresponding to the halo (for example, a plot or an affected character), rendering details of the battle behavior, or the like.

2. The first server transmits the battle rendering label to the second server.

The first server may package the battle rendering label and the halo information into the invocation request, and transmit the invocation request to the second server in an RPC manner.

3. The second server transmits the battle rendering label to the scene control process, where the battle rendering label is transmitted by the scene control process to the battle control process.

The foregoing procedure describes related content of the battle rendering label. Through the battle rendering label, the display position and the display occasion of the halo can be indicated more intuitively, thereby improving the pertinence of the picture rendering procedure, reducing a transmission amount of data that needs to be exchanged for a plurality of times, and improving the picture rendering efficiency while improving a battle rendering effect. In addition, the synchronization procedure of the battle control side and the scene control side further improves the integration between the world scene and the battle scene, and resolves the problem of processing duplicated data on the battle control side and the scene control side.

After receiving the invocation request, the second server generates the halo rendering information, and transmits the halo rendering information and the battle rendering label to the scene control process together, to transmit the halo rendering information and the battle rendering label to the battle control process through the scene control process. The battle control process renders, according to the display occasion and the display position that are indicated by the battle rendering label, the halo according to the halo rendering information in a procedure of rendering the battle behavior according to the battle rendering information.

In an embodiment, the turn-based battle includes an intermediate turn battle and a last turn battle, where the intermediate turn battle is a battle other than the last turn battle in the turn-based battle.

In an example, the second server transmits, in a case that the halo is triggered in the intermediate turn battle, the halo rendering information and the battle rendering label generated by the first server to the scene control process. The intermediate turn battle is a battle other than the last turn battle in the turn-based battle.

Alternatively, the second server transmits, in a case that the halo is triggered in the last turn battle, the halo rendering information, the battle rendering label generated by the first server, and a turn-based battle end notification to the scene control process. The second server informs, by transmitting the turn-based battle end notification, the scene control process that the turn-based battle is about to end and connection preparation for rendering the halo may be performed.

In the foregoing procedure, a difference between content transmitted by the second server in the intermediate turn battle and the last turn battle is respectively described. In the intermediate turn battle, considering that the battle does not end, the second server indicates, through the procedure of transmitting the halo rendering information and the battle rendering label, the scene control process to continue to perform a subsequent procedure of scene rendering based on the content; and in the last turn battle, considering that the battle is about to end, the second server indicates, through the procedure of transmitting the halo rendering information, the battle rendering label, and the battle end notification, the scene control process to stop data reception and scene rendering procedures after performing scene rendering based on the content, thereby avoiding a resource waste caused by extra data transmission.

In this embodiment of this disclosure, when the pet virtual character serves as an attacking party, active displacement may be generated. When the pet virtual character serves as an attacked party, passive displacement may be generated, and when the pet virtual character is attacked by an ability, a displacement procedure of being knocked back may be generated. As the position of the pet virtual character changes, an environment (including an environment of a plot in which the pet virtual character is located and an environment of weather) in which the pet virtual character is located may also change, affecting a battle of the pet virtual character in subsequent turns. Therefore, in each turn battle, an environment affinity (referred to as an affinity for short, namely, the foregoing affinity effect) between the pet virtual character and the virtual world needs to be re-determined, which may include the following content.

1. The first server transmits a request for obtaining updated environment information to the second server after receiving a rendering end notification for the battle behavior from the battle control process, where the updated environment information is environment information of the battle scene after being affected by the halo.

The rendering end notification is configured for informing the first server that the battle behavior and the halo are rendered. The request for obtaining updated environment information is configured for requesting to obtain the updated environment information. The environment information may include weather information, plot information, and time information.

2. The second server transmits the updated environment information to the first server.

After pulling the updated environment information, the second server transmits the updated environment information to the first server.

3. The first server generates an affinity rendering animation according to the updated environment information, where the affinity rendering animation is configured for representing an affinity between the participant and the updated environment information, and the affinity has impact on ability power of the participant.

In some embodiments, the first server may generate the affinity rendering animation according to an affinity between the participant and an environment, and a procedure may be as follows:

1. The first server determines plot potential energy and weather potential energy that correspond to the participant according to the updated environment information, where the plot potential energy is configured for representing impact of a type of the plot on the participant, and the weather potential energy is configured for representing impact of weather and time on the participant.

The weather potential energy may be determined according to the time information and the weather information.

2. The first server determines environment potential energy corresponding to the participant according to the plot potential energy and the weather potential energy that correspond to the participant.

In some embodiments, the environment potential energy may include two parts: the weather potential energy and the plot potential energy.

3. The first server generates the affinity rendering animation according to the environment potential energy corresponding to the participant and attribute information of the participant.

The first server may determine the affinity between the participant and the environment according to the environment potential energy corresponding to the participant and the attribute information of the participant, and then generate the affinity rendering animation according to the affinity. A method for determining the affinity is the same as the description in the foregoing embodiments.

4. The first server transmits the affinity rendering animation to the battle control process.

In the foregoing procedure, the procedure that the first server generates the affinity rendering animation according to the affinity between the participant and the environment is described. The first server, serving as a server that is responsible for processing a battle status, can determine impact of various updated environment information on the participant in a case that the participant initiates the battle behavior, to achieve an objective of analyzing the participant in real time, and can further determine impact of the environment on the ability power of the participant in real time. The content represents the affinity between the participant and the environment, and the affinity rendering animation is generated according to the affinity that is determined in real time, so that an environment status of the battle scene after being affected by the halo can be presented in a more timely manner, thereby enriching a picture presentation effect while greatly improving the realness of the displayed picture, helping the player decide a next battle status through the affinity rendering animation, and improving the human-machine interaction efficiency.

Content of generating the affinity rendering animation according to the updated environment information is described. After the updated environment information representing that the battle scene is affected by the halo is obtained, the plot potential energy representing the impact of the type of the plot on the participant is determined, and the weather potential energy representing the impact of the weather and the time on the participant is determined, so that various factors and an impact status between the factors are considered more comprehensively by combining the environment potential energy represented by the plot potential energy and the weather potential energy and the attribute information of the participant. Therefore, the affinity rendering animation of the impact caused by the environment potential energy on the ability power of the participant can be generated in a more timely manner and more accurately, the realness of the affinity rendering animation is improved, and the experience consistency between the battle scene and the world scene is ensured while full battle experience is provided to the player, thereby avoiding a sense of separation between the scenes, and improving the efficiency of data exchange between different scenes.

After receiving the affinity rendering animation, the battle control process displays the affinity rendering animation in the battle scene.

Based on the above, according to the technical solutions provided in the embodiments of this disclosure, environment generation of battle behavior and environment generation of non-battle behavior are no longer performed by two servers respectively. Instead, for the battle behavior, the first server transmits few halo information to the second server, so that even if data related to the environment generation is also processed by the second server for the battle behavior, and a problem that a data transmission amount is great because the second server needs to update and copy entire environment data to the first server can be avoided, which not only greatly reduces a transmission amount of data exchange between the first server and the second server, but can also avoid a redundancy problem that both the first server and the second server maintain one piece of scene data in a manner of maintaining one piece of scene information on a second server side, thereby further reducing maintenance overheads of the server, helping improve the interface display efficiency, and improving the human-machine interaction efficiency.

In addition, by supporting the battle control process in executing the battle behavior processing logic and supporting the scene control process in executing the halo processing logic, different processes implement logic execution procedures in a more targeted manner, and through decoupling between the halo processing logic and the battle behavior processing logic, the service logic independence is improved, and the maintenance and expansion difficulty of the turn-based battle are further reduced. Meanwhile, because underlying code that originally belongs to the first server or the second server does not need to be compatible with both the first server and the second server, the code development difficulty is greatly reduced, thereby helping improve the interaction efficiency between the client and the server and reducing the system maintenance costs.

In addition, by supporting the first server in delivering the battle rendering information and supporting the second server in delivering the halo rendering information, a problem that the client needs to be consider a plurality of rendering information sources when processing the same rendering information because both the first server and second server need to deliver the battle rendering information or the halo rendering information is avoided, thereby reducing pressure of the client in processing the rendering information.

Figure 12:
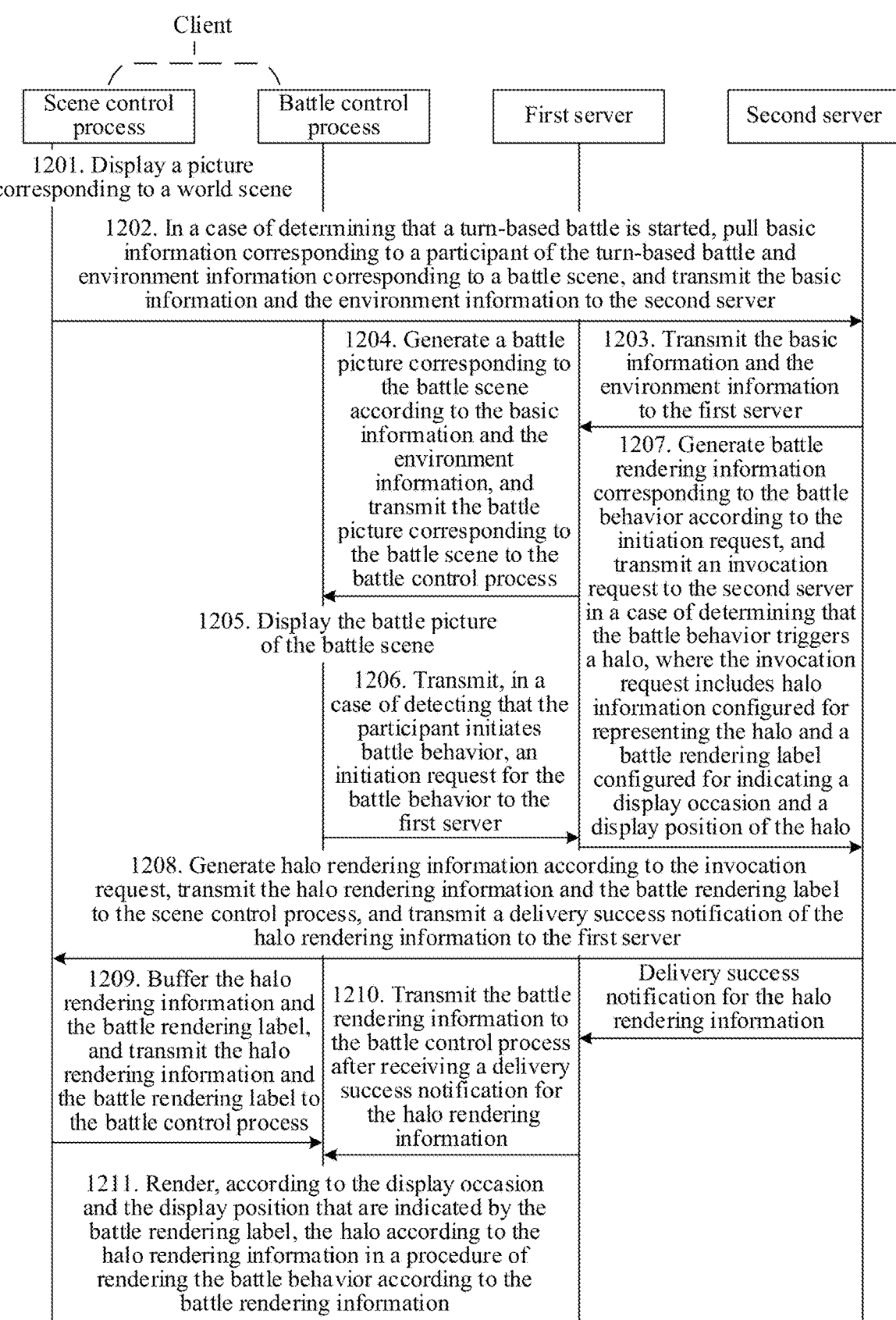
FIG. 12 and FIG. 13 show a flowchart of a turn-based battle-based interface display method according to another embodiment of this disclosure.
Figure 13:
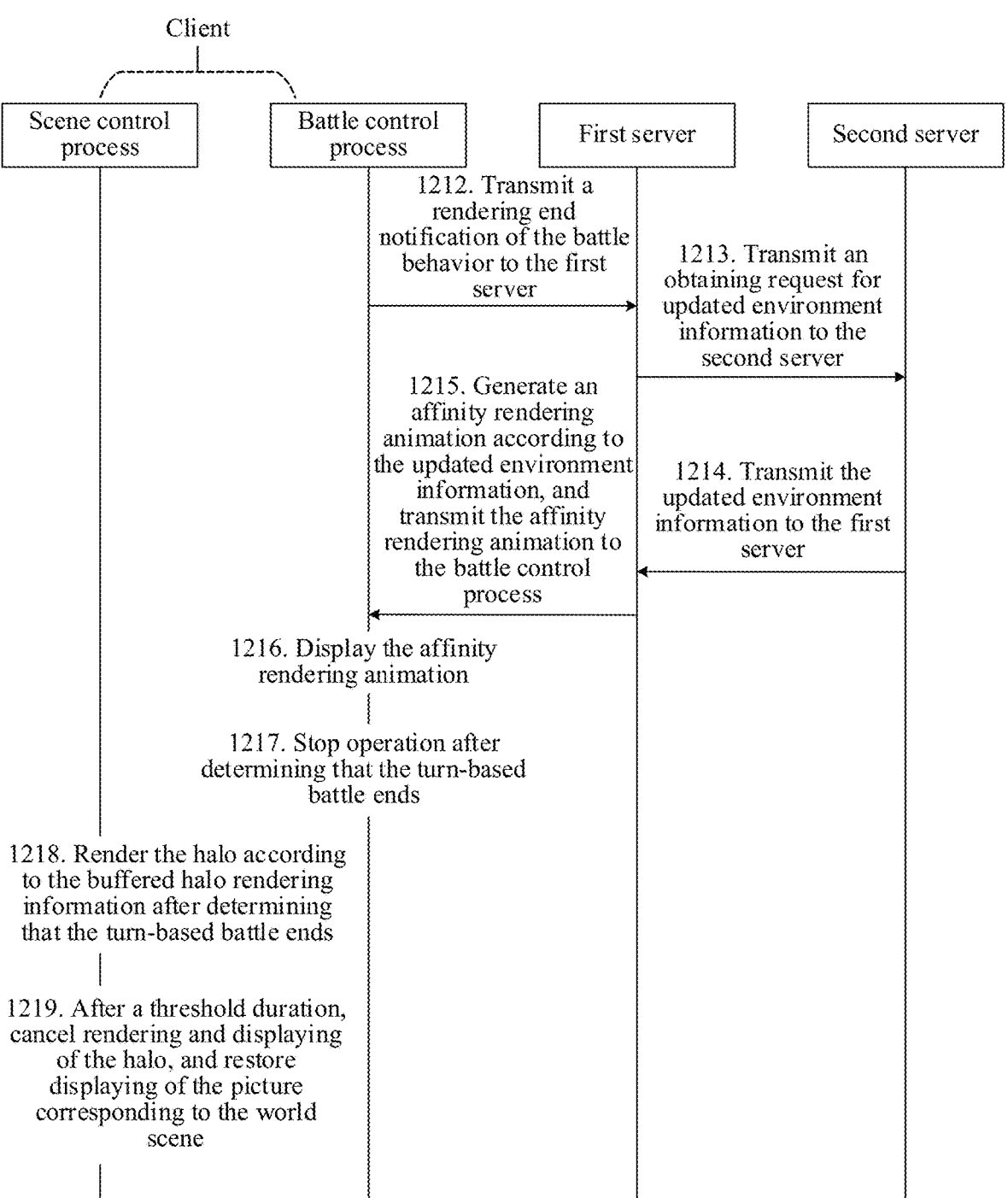

FIG. 12 and FIG. 13 show a flowchart of a turn-based battle-based interface display method according to another embodiment of this disclosure. An entity executing the operations of the method may be the terminal 310 or the server 320 in the solution implementation environment shown in FIG. 3. The method may include the following several operations (operation 1201 to operation 1219):

Operation 1201. A scene control process displays a picture corresponding to a world scene.

Operation 1202. The scene control process pulls, in a case of determining that a turn-based battle is started, basic information corresponding to a participant of the turn-based battle and environment information corresponding to a battle scene, and transmits the basic information and the environment information to a second server.

Operation 1203. The second server transmits the basic information and the environment information to a first server.

Operation 1204. The first server generates a battle picture corresponding to the battle scene according to the basic information and the environment information, and transmits the battle picture of the battle scene to a battle control process.

Operation 1205. The battle control process displays the battle picture of the battle scene.

Operation 1206. The battle control process transmits, in a case of determining that the participant initiates battle behavior, an initiation request for the battle behavior to the first server.

Operation 1207. The first server generates, after receiving the initiation request for the battle behavior, battle rendering information corresponding to the battle behavior according to the initiation request, and transmits an invocation request to the second server in a case of determining that the battle behavior triggers a halo, where the invocation request includes halo information configured for representing the halo and a battle rendering label configured for indicating a display occasion and a display position of the halo.

Operation 1208. The second server generates halo rendering information according to the invocation request, transmits the halo rendering information and the battle rendering label to the scene control process, and transmits a delivery success notification for the halo rendering information to the first server, where the halo rendering information is configured for rendering the halo.

Operation 1209. The scene control process buffers the halo rendering information and the battle rendering label, and transmits the halo rendering information and the battle rendering label to the battle control process.

Operation 1210. The first server transmits the battle rendering information to the battle control process after receiving the delivery success notification for the halo rendering information.

Operation 1211. The battle control process renders, according to the display occasion and the display position that are indicated by the battle rendering label, the halo according to the halo rendering information in a procedure of rendering the battle behavior according to the battle rendering information.

Operation 1212. The battle control process transmits a rendering end notification for the battle behavior to the first server.

Operation 1213. The first server transmits a request for obtaining updated environment information to the second server, where the updated environment information is environment information of the battle scene after being affected by the halo.

Operation 1214. The second server transmits the updated environment information to the first server.

Operation 1215. The first server generates an affinity rendering animation according to the updated environment information, and transmits the affinity rendering animation to the battle control process.

Operation 1216. The battle control process displays the affinity rendering animation.

Operation 1217. The battle control process stops operation after determining that the turn-based battle ends.

Operation 1218. The scene control process renders the halo according to the buffered halo rendering information after determining that the turn-based battle ends.

Operation 1219. After a threshold duration, the scene control process cancels rendering and displaying of the halo, and restore displaying of the picture corresponding to the world scene.

Figures 14, 15:
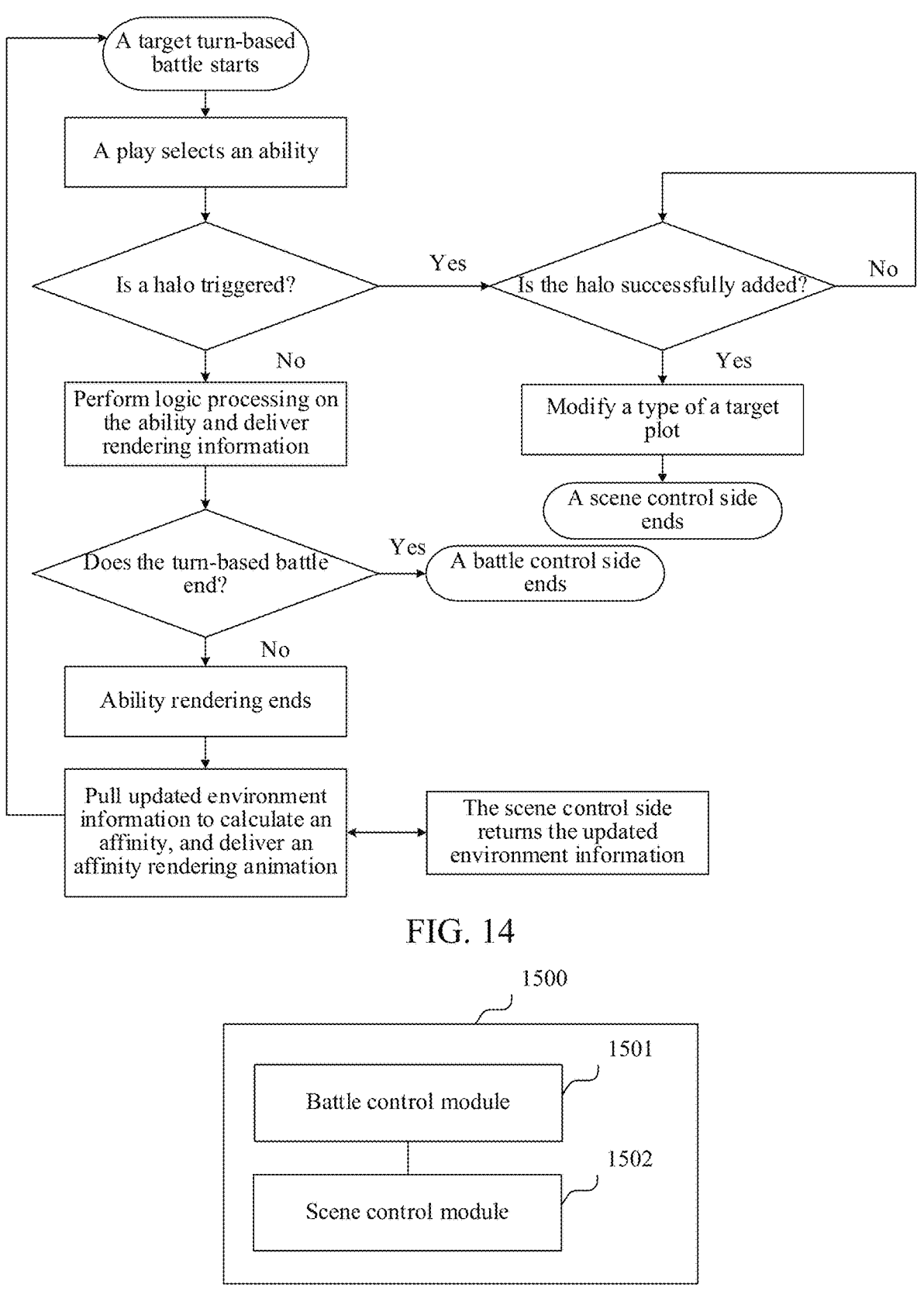
FIG. 14 is a schematic diagram of interaction between a battle control side and a scene control side according to an embodiment of this disclosure.
FIG. 15 is a block diagram of a turn-based battle-based interface display apparatus according to an embodiment of this disclosure.

In some embodiments, referring to FIG. 14, in a turn battle of a turn-based battle, a leftmost vertical procedure is a main procedure cyclical between turns on a battle control side, and mainly interacts with a scene control side at two time points: The first time point is a time point after a player selects an ability, in this case, whether the ability triggers a halo is determined, and in a case that the ability triggers a halo, the battle control side needs to interact with the scene control side. The battle scene needs to transmits an invocation request for halo rendering information to the scene control side, to request to obtain the halo rendering information. Then, whether to modify a virtual world (for example, a plot) is decided according to whether the halo is successfully added, and a procedure on the scene control side is ended.

The second time point is a time point at which the turn-based battle does not end and determining that the ability and the halo are rendered, in this case, a first server on the battle control side needs to pull updated environment information from a second server on the scene control side, generate an affinity rendering animation according to the updated environment information, and deliver the affinity rendering animation to a battle control process on the battle control side for displaying.

Based on the above, according to the technical solutions provided in the embodiments of this disclosure, implementation of the battle behavior processing logic is supported through the battle control process and the first server to obtain the battle rendering information, and implementation of the halo processing logic is supported through the scene control process and the second server to obtain the halo rendering information. Therefore, there is no need to maintain one piece of battle behavior processing logic and one piece of halo processing logic on both the battle control side and the scene control side, and it is only required to maintain one piece of scene information on the scene control side, thereby reducing the service logic and data maintenance redundancy of the turn-based battle, and further reducing the maintenance overheads.

The following is an apparatus embodiment of this disclosure, which may be configured for performing the method embodiments of this disclosure. For details not disclosed in the apparatus embodiment of this disclosure, reference may be made to the method embodiments of this disclosure.

FIG. 15 shows a block diagram of a turn-based battle-based interface display apparatus according to an embodiment of this disclosure. The apparatus has a function of realizing the above method examples, and the function may be realized by hardware or by hardware executing corresponding software. The apparatus may be the computer device described above, or may be disposed in the computer device. As shown in FIG. 15, the apparatus 1500 includes: a battle control module 1501 and a scene control module 1502.

The battle control module 1501 is configured to transmit, in a case of detecting that a participant of a turn-based battle initiates battle behavior, an initiation request for the battle behavior to a first server, where the first server is configured to process the battle behavior.

The battle control module 1501 is further configured to receive battle rendering information from the first server, where the battle rendering information is configured for rendering the battle behavior.

The scene control module 1502 is configured to receive halo rendering information from a second server, where the second server is configured to process a world environment of a virtual world; and the halo rendering information is information generated by the second server according to halo information transmitted by the first server, the halo information is configured for representing a halo triggered by the battle behavior, and the halo has impact on an element in a battle scene of the turn-based battle.

The battle control module 1501 is further configured to render the halo according to the halo rendering information in a procedure of rendering the battle behavior based on the battle rendering information.

In some embodiments, the scene control module 1502 is further configured to receive, through the scene control process, a battle rendering label from the second server, where the battle rendering label is a label generated by the first server according to the battle behavior in a case that the battle behavior meets a condition for triggering the halo.

The scene control module 1502 is further configured to transmit, through the scene control process, the battle rendering label to the battle control process.

The battle control module 1501 is further configured to render, through the battle control process according to a display occasion and a display position that are indicated by the battle rendering label, the halo according to the halo rendering information in the procedure of rendering the battle behavior based on the battle rendering information.

In some embodiments, the scene control module 1502 is further configured to:

buffer, through the scene control process, the halo rendering information; and render, through the scene control process, the halo according to the buffered halo rendering information.

In some embodiments, the scene control module 1502 is further configured to obtain, through the scene control process in a case of entering the turn-based battle, basic information corresponding to the participant and environment information corresponding to the battle scene, and transmit the basic information and the environment information to the second server;

The battle control module 1501 is further configured to receive, through the battle control process, a battle picture of the turn-based battle from the first server, where the battle picture is a picture generated by the first server according to the basic information and the environment information that are transmitted by the second server.

The battle control module 1501 is further configured to display the battle picture through the battle control process.

In some embodiments, the battle control module 1501 is further configured to transmit, through the battle control process, a rendering end notification for the battle behavior to the first server.

The battle control module 1501 is further configured to receive, through the battle control process, an affinity rendering animation from the first server, where the affinity rendering animation is an animation generated by the first server according to updated environment information transmitted by the second server, the updated environment information is environment information of the battle scene after being affected by the halo, the affinity rendering animation is configured for representing an affinity between the participant and the updated environment information, and the affinity has impact on ability power of the participant.

The battle control module 1501 is further configured to display, through the battle control process, the affinity rendering animation.

Based on the above, according to the technical solutions provided in the embodiments of this disclosure, implementation of the battle behavior processing logic is supported through the first server to obtain the battle rendering information, and implementation of the halo processing logic is supported through the second server to obtain the halo rendering information. Therefore, through the foregoing procedure, it can be avoided from maintaining one piece of battle behavior processing logic and one piece of halo processing logic on both the battle control side and the scene control side by maintaining one piece of scene information on the scene control side, thereby significantly reducing the service logic and data maintenance redundancy of the turn-based battle, and further reducing the maintenance overheads.

When the apparatus provided in the foregoing embodiment implements the functions of the apparatus, the division of the foregoing functional modules is merely an example for description. During practical application, the functions may be assigned to and completed by different functional modules according to the requirements, namely, the internal structure of the device is divided into different functional modules, to implement all or some of the functions described above. In addition, the apparatus provided in the foregoing embodiment and the method embodiments fall within the same conception. For details of a specific implementation process, reference may be made to the method embodiments. Details are not described herein again.

Figure 16:
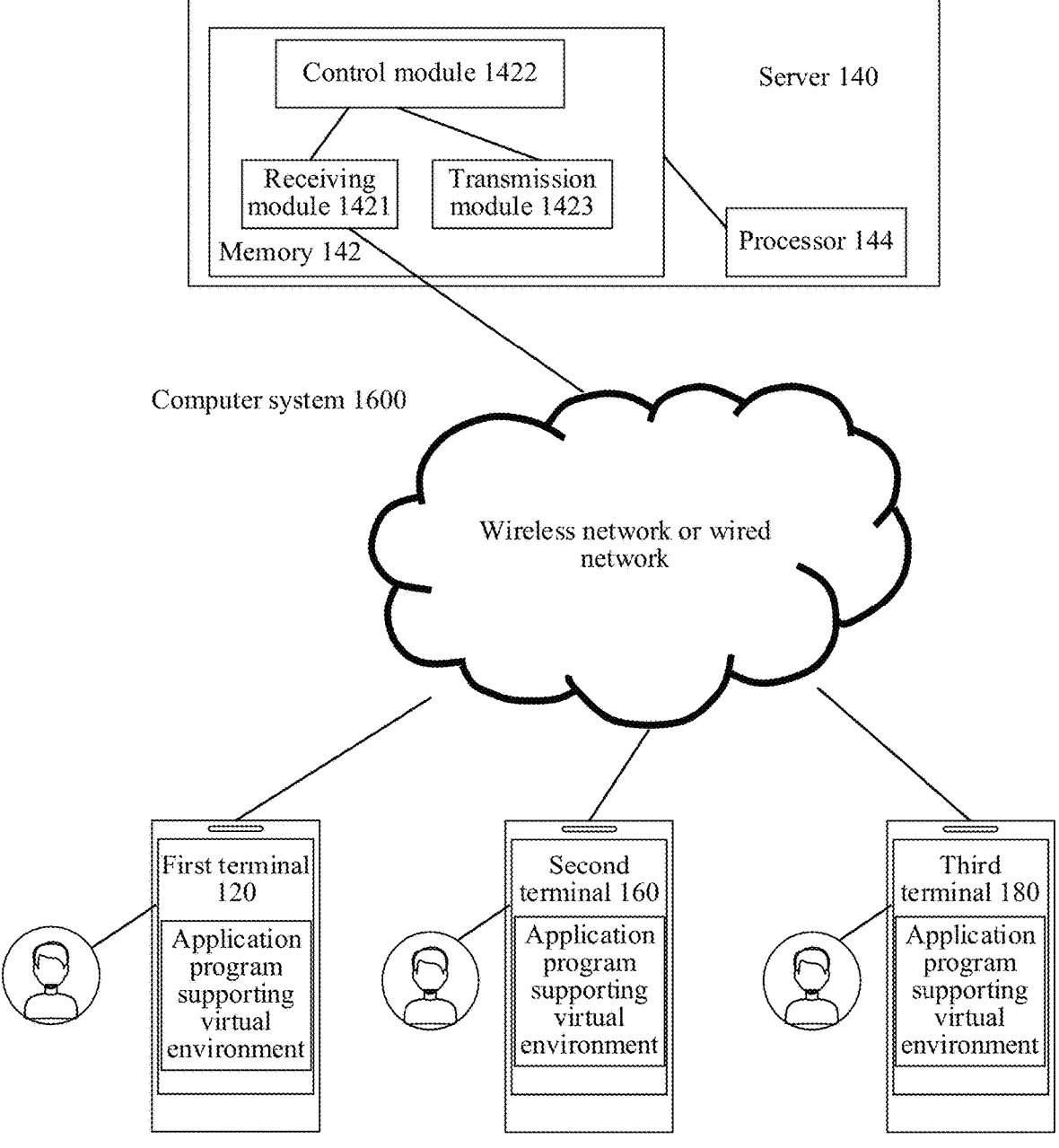
FIG. 16 is a structural block diagram of a computer system according to an embodiment of this disclosure.

FIG. 16 shows a structural block diagram of a computer system according to an embodiment of this disclosure. The computer system 1600 includes: a first terminal 120, a server 140, a second terminal 160, and a third terminal 180.

An application program supporting a virtual world is installed and run on the first terminal 120. The application program may be any one of a three-dimensional map program, a virtual reality application program, an augmented reality program, an RPG program, a turn-based game program, or a turn-based RPG program. The first terminal 120 is a terminal used by a first user. The first user uses the first terminal 120 to control a first virtual character located in the virtual world to perform activities.

The first terminal 120 is connected to the server 140 through a wireless network or a wired network.

The server 140 includes at least one of one server, a plurality of servers, a cloud computing platform, and a virtualization center. For example, the server 140 includes a processor 144 and a memory 142, and the memory 142 further includes a receiving module 1421, a control module 1422, and a transmission module 1423. The receiving module 1421 is configured to receive a request transmitted by a client, for example, a request for detecting a position of an enemy virtual character; the control module 1422 is configured to control rendering of a picture of the virtual world; and the transmission module 1423 is configured to transmit a response to the client, for example, transmit a position of a third virtual character to the client. The server 140 is configured to provide a backend service for an application program supporting a three-dimensional virtual world.

An application program supporting a virtual world is installed and run on the second terminal 160. The second terminal 160 is a terminal used by a second user. The second user uses the second terminal 160 to control a second virtual character located in the virtual world to perform activities, and the second virtual character also serves as a master virtual character. An application program supporting a virtual world is installed and run on the third terminal 180. The third terminal 180 is a terminal used by a third user. The third user uses the third terminal 180 to control a third virtual character located in the virtual world to perform activities.

In some embodiments, the first virtual character, the second virtual character, and the third virtual character are located in the same virtual world. The first virtual character and the second virtual character belong to different camps, and the second virtual character and the third virtual character belong to the same camp.

In some embodiments, the application programs installed on the first terminal 120, the second terminal 160, and the third terminal 180 are the same, or the application programs installed on the three terminals are the same type of application programs on different operating system platforms (Android system or iOS system). The first terminal 120 may generally refer to one of a plurality of terminals, the second terminal 160 may generally refer to one of a plurality of terminals, and the third terminal 180 may generally refer to one of a plurality of terminals. In this embodiment, only the first terminal 120, the second terminal 160, and the third terminal 180 are configured for description. The first terminal 120, the second terminal 160, and the third terminal 180 are of the same device type or of different device types. The device type includes at least one of a smartphone, a smart watch, a smart television, a tablet computer, an e-book reader, a Moving Picture Experts Group Audio Layer III (MP3) player, a Moving Picture Experts Group Audio Layer IV (MP4) player, a laptop, and a desktop computer. The following embodiment is described by using an example in which the terminal includes a smartphone.

A person skilled in the art may understand that there may be more or fewer terminals. For example, there may be only one terminal, or there may be dozens of or hundreds of terminals or more. A number and the device type of the terminals are not limited in this embodiment of this disclosure.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

Figure 17:
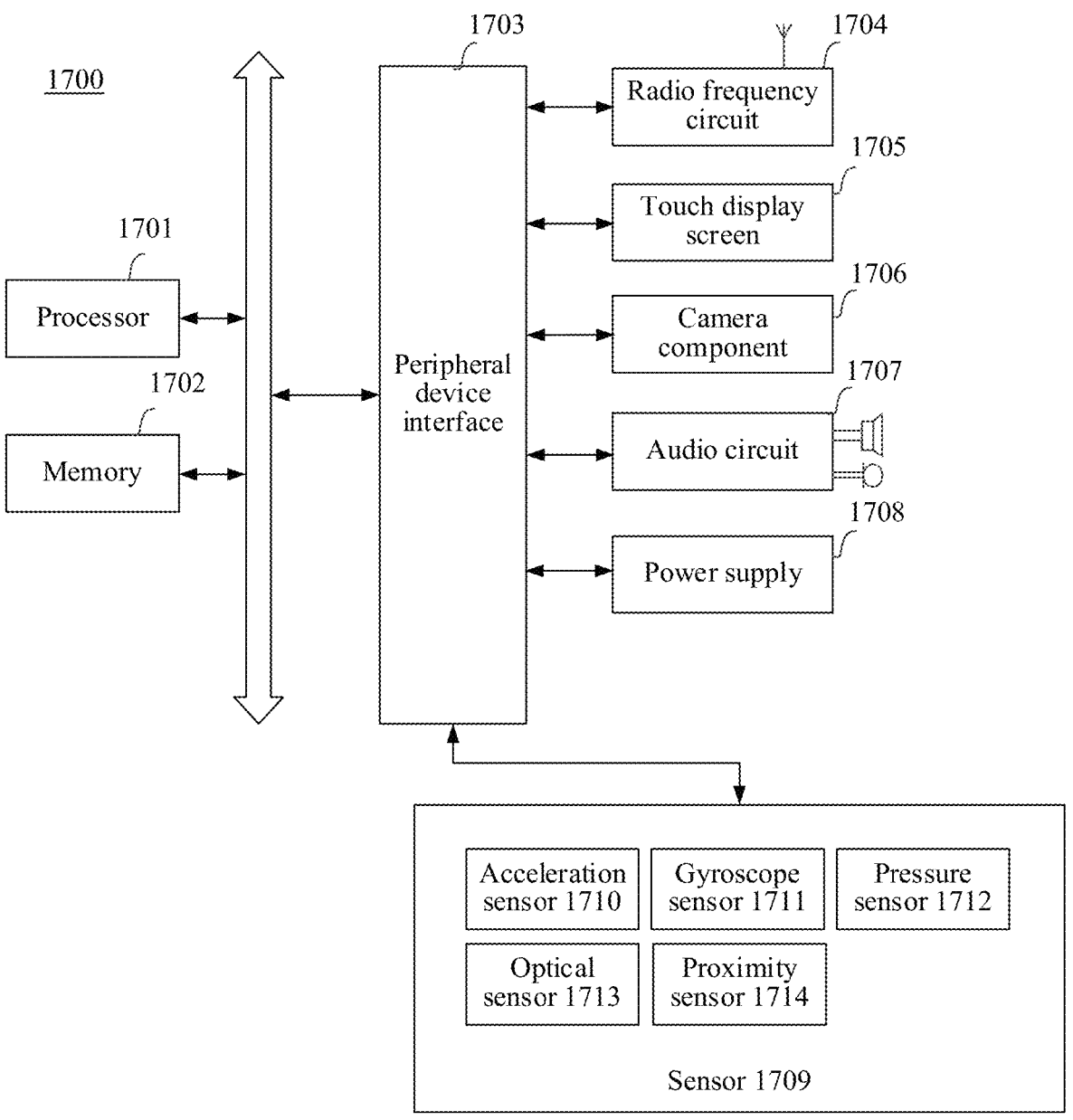
FIG. 17 is a structural block diagram of a computer device according to an embodiment of this disclosure.

FIG. 17 shows a structural block diagram of a computer device 1700 according to an embodiment of this disclosure. The computer device 1700 may be a portable mobile terminal, such as a smartphone, a tablet computer, a Moving Picture Experts Group Audio Layer III (MP3) player, or a Moving Picture Experts Group Audio Layer IV (MP4) player. The computer device 1700 may be further referred to as another name such as user equipment or a portable terminal.

The computer device 1700 includes processing circuitry, such as a processor 1701, and a memory 1702.

The processor 1701 may include one or more processing cores, and may be, for example, a 4-core processor or an 8-core processor.

The memory 1702 may include one or more computer-readable storage media. The computer-readable storage medium may be tangible or non-transient.

In some embodiments, the computer device 1700 further includes a peripheral device interface 1703 and at least one peripheral device. Specifically, the peripheral device includes: at least one of a radio frequency (RF) circuit 1704, a touch display screen 1705, a camera 1706, an audio circuit 1707, and a power supply 1708.

In some embodiments, the computer device 1700 further includes one or more sensors 1709. The one or more sensors 1709 include, but are not limited to, an acceleration sensor 1710, a gyroscope sensor 1711, a pressure sensor 1712, an optical sensor 1713, and a proximity sensor 1714.

A person skilled in the art may understand that the structure shown in FIG. 17 does not constitute any limitation on the computer device 1700, and the computer device may include more or fewer components than those shown in the figure, or some components may be combined, or a different component deployment may be used.

In an embodiment, a computer-readable storage medium, such as a non-transitory computer-readable storage medium, is further provided, the storage medium has a computer program stored therein, and the computer program, when executed by a processor, implements the turn-based battle-based interface display method described above or the turn-based battle-based information providing method described above.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an embodiment, a computer program product or a computer program is provided. The computer program product or the computer program includes computer instructions, and the computer instructions are stored in a computer-readable storage medium. A processor of a computer device reads the computer instructions from the computer-readable storage medium, and the processor executes the computer instructions, to cause the computer device to perform the turn-based battle-based interface display method described above or perform the turn-based battle-based information providing method described above.

"Plurality of" mentioned in this specification means two or more. "And/or" describes an association relationship between associated objects and represents that three relationships may exist. For example, A and/or B may represent the following three cases: Only A exists, both A and B exist, and only B exists. The character "/" generally indicates an "or" relationship between the associated objects. In addition, the operation numbers described in this specification merely schematically show a possible execution sequence of the operations. In some other embodiments, the operations may not be performed according to the number sequence. For example, two operations with different numbers may be performed simultaneously, or two operations with different numbers may be performed according to a sequence contrary to the sequence shown in the figure.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

The foregoing are merely examples of embodiments of this disclosure and is not intended to limit this disclosure, any modification, equivalent replacement, improvement, or the like made within the spirit and principle of this disclosure shall fall within the protection scope of this disclosure.

What is claimed is:

1. A turn-based battle-based interface display method, comprising:

transmitting, when a user initiates a battle action of a turn-based battle, an initiation request for the battle action to a first server;

receiving battle rendering information of the battle action from the first server;

receiving, by processing circuitry, halo rendering information from a second server, the second server being configured to process a virtual environment, the halo rendering information being generated by the second server according to halo information transmitted by the first server, the halo information representing a halo triggered by the battle action, and the halo impacting an element in a battle scene of the turn-based battle; and rendering, by the processing circuitry, the halo according to the halo rendering information in a process of rendering the battle action based on the battle rendering information.

2. The method according to claim 1, wherein the transmitting the initiation request includes transmitting, by a battle control process, the initiation request for the battle action to the first server;

the receiving the battle rendering information includes receiving, by the battle control process, the battle rendering information from the first server;

the receiving the halo rendering information includes receiving, by a scene control process, the halo rendering information from the second server;

the method includes transmitting, by the scene control process, the halo rendering information to the battle control process; and the rendering the halo includes rendering, by the battle control process, the halo according to the halo rendering information in the process of rendering the battle action based on the battle rendering information.

3. The method according to claim 2, wherein the method further comprises:

receiving, by the scene control process, a battle rendering label from the second server, the battle rendering label being generated by the first server according to the battle action when the battle action meets a condition for triggering the halo;

transmitting, by the scene control process, the battle rendering label to the battle control process; and the rendering, by the battle control process, the halo includes rendering, by the battle control process according to a display event and a display position that are indicated by the battle rendering label, the halo according to the halo rendering information in the process of rendering the battle action based on the battle rendering information.

4. The method according to claim 2, wherein the method further comprises:

buffering, by the scene control process, the halo rendering information; and rendering, by the scene control process, the halo according to the buffered halo rendering information.

5. The method according to claim 2, wherein the method further comprises:

obtaining, by the scene control process when entering the turn-based battle, basic information corresponding to a virtual object and environment information corresponding to the battle scene, and transmitting the basic information and the environment information to the second server;

receiving, by the battle control process, a battle image of the turn-based battle from the first server, the battle image being generated by the first server according to the basic information and the environment information that are transmitted by the second server; and displaying, by the battle control process, the battle image.

6. The method according to claim 2, wherein the method further comprises:

transmitting, by the battle control process, a rendering end notification for the battle action to the first server;

receiving, by the battle control process, an affinity rendering animation from the first server, the affinity rendering animation being generated by the first server according to updated environment information transmitted by the second server, the updated environment information being environment information of the battle scene after being affected by the halo, the affinity rendering animation representing an affinity between a virtual object and the updated environment information, and the affinity impacting an ability of the virtual object; and displaying, by the battle control process, the affinity rendering animation.

7. A non-transitory computer-readable storage medium, storing instructions which when executed by a processor cause the processor to perform the method of claim 1.

8. A turn-based battle-based information providing method, comprising:

receiving, by a first server, an initiation request for a battle action from a battle control process;

generating, by processing circuitry of the first server, battle rendering information corresponding to the battle action according to the initiation request, the battle action being initiated by a virtual object of a turn-based battle;

transmitting, by the first server, an invocation request to a second server when the battle action triggers a halo, the invocation request including halo information representing the halo, and the halo impacting an element in a battle scene of the turn-based battle;

generating, by a second server, halo rendering information according to the invocation request;

transmitting the halo rendering information to a scene control process that is configured to transmit the halo rendering information to the battle control process; and transmitting, by the first server, the battle rendering information to the battle control process after receiving a delivery success notification for the halo rendering information from the second server.

9. The method according to claim 8, wherein the method further comprises:

generating, by the first server, a battle rendering label according to the battle action when the battle action triggers the halo, the battle rendering label indicating a display event and a display position of the halo;

transmitting, by the first server, the battle rendering label to the second server; and transmitting, by the second server, the battle rendering label to the scene control process that is configured to transmit the battle rendering label to the battle control process.

10. The method according to claim 9, wherein the turn-based battle includes an intermediate turn battle and a last turn battle; and the method further comprises:

transmitting, by the second server when the halo is triggered in the intermediate turn battle, the halo rendering information and the battle rendering label generated by the first server to the scene control process; and transmitting, by the second server when the halo is triggered in the last turn battle, the halo rendering information, the battle rendering label, and a turn-based battle end notification to the scene control process.

11. The method according to claim 8, wherein the generating, by the second server, the halo rendering information includes generating, by the second server when an existing halo already exists in a plot corresponding to the halo, the halo rendering information according to a relationship between the existing halo and the halo;

when a covering relationship exists between the existing halo and the halo, the halo rendering information indicates that an impact of the existing halo on the plot is canceled and an impact of the halo on the plot is added; and when a mutually exclusive relationship exists between the existing halo and the halo, the halo rendering information indicates that the impact of the existing halo on the plot is maintained.

12. The method according to claim 8, wherein the method further comprises:

receiving, by the second server, basic information corresponding to the virtual object and environment information corresponding to the battle scene that are transmitted by the scene control process;

transmitting, by the second server, the basic information and the environment information to the first server;

generating, by the first server, a battle picture of the turn-based battle according to the basic information and the environment information; and transmitting the battle picture to the battle control process.

13. The method according to claim 8, wherein the method further comprises:

transmitting, by the first server, a request for obtaining updated environment information to the second server after receiving a rendering end notification for the battle action from the battle control process, the updated environment information including environment information of the battle scene after being affected by the halo;

transmitting, by the second server, the updated environment information to the first server;

generating, by the first server, an affinity rendering animation according to the updated environment information, the affinity rendering animation representing an affinity between the virtual object and the updated environment information, and the affinity impacting an ability of the virtual object; and transmitting, by the first server, the affinity rendering animation to the battle control process.

14. The method according to claim 13, wherein the generating, by the first server, the affinity rendering animation comprises:

determining, by the first server, plot potential energy and weather potential energy that correspond to the virtual object according to the updated environment information, the plot potential energy representing an impact of a type of the plot on the virtual object, and the weather potential energy representing an impact of weather on the virtual object;

determining, by the first server, environment potential energy corresponding to the virtual object according to the plot potential energy and the weather potential energy that correspond to the virtual object; and generating, by the first server, the affinity rendering animation according to the environment potential energy corresponding to the virtual object and attribute information of the virtual object.

15. A turn-based battle-based interface display apparatus, comprising:

processing circuitry configured to execute a battle control module and a scene control module, wherein the battle control module is configured to transmit, when a user initiates a battle action of a turn-based battle, an initiation request for the battle action to a first server;

the battle control module is configured to receive battle rendering information of the battle action from the first server;

the scene control module is configured to receive halo rendering information from a second server, the second server being configured to process a virtual environment, the halo rendering information being generated by the second server according to halo information transmitted by the first server, the halo information representing a halo triggered by the battle action, and the halo impacting an element in a battle scene of the turn-based battle; and the battle control module is configured to render the halo according to the halo rendering information in a process of rendering the battle action based on the battle rendering information.

16. The apparatus according to claim 15, wherein the battle control module is configured to transmit, through a battle control process, the initiation request for the battle action to the first server, and receive the battle rendering information from the first server;

the scene control module is configured to receive the halo rendering information from the second server through a scene control process, and transmit the halo rendering information to the battle control process; and the battle control module is configured to render, through the battle control process, the halo according to the halo rendering information in the process of rendering the battle action based on the battle rendering information.

17. The apparatus according to claim 16, wherein the scene control module is configured to receive, through the scene control process, a battle rendering label from the second server, the battle rendering label being generated by the first server according to the battle action when the battle action meets a condition for triggering the halo; and transmit, through the scene control process, the battle rendering label to the battle control process; and the battle control module is configured to render, through the battle control process according to a display event and a display position that are indicated by the battle rendering label, the halo according to the halo rendering information in the process of rendering the battle action based on the battle rendering information.

18. The apparatus according to claim 16, wherein the scene control module is configured to:

buffer the halo rendering information; and render the halo according to the buffered halo rendering information.

19. The apparatus according to claim 16, wherein the scene control module is configured to obtain, when entering the turn-based battle, basic information corresponding to a virtual object and environment information corresponding to the battle scene, and transmit the basic information and the environment information to the second server; and the battle control module is configured to:

receive a battle image of the turn-based battle from the first server, the battle image being generated by the first server according to the basic information and the environment information that are transmitted by the second server, and display the battle image.

20. The apparatus according to claim 16, wherein the battle control module is configured to:

transmit a rendering end notification for the battle action to the first server;

receive an affinity rendering animation from the first server, the affinity rendering animation being generated by the first server according to updated environment information transmitted by the second server, the updated environment information being environment information of the battle scene after being affected by the halo, the affinity rendering animation representing an affinity between a virtual object and the updated environment information, and the affinity impacting an ability of the virtual object; and display the affinity rendering animation.

* * * * *